Sept. 30, 1958 B. A. HARRIS 2,854,519

TELEPHONE SYSTEM INCLUDING LINE IDENTIFYING MEANS

Filed April 18, 1956 9 Sheets-Sheet 1

INVENTOR.
Ben A. Harris
BY
Francis E. Blake
Atty

Sept. 30, 1958 B. A. HARRIS 2,854,519

TELEPHONE SYSTEM INCLUDING LINE IDENTIFYING MEANS

Filed April 18, 1956 9 Sheets-Sheet 2

Sept. 30, 1958 B. A. HARRIS 2,854,519

TELEPHONE SYSTEM INCLUDING LINE IDENTIFYING MEANS

Filed April 18, 1956 9 Sheets-Sheet 3

Sept. 30, 1958 B. A. HARRIS 2,854,519

TELEPHONE SYSTEM INCLUDING LINE IDENTIFYING MEANS

Filed April 18, 1956 9 Sheets-Sheet 4

Sept. 30, 1958 B. A. HARRIS 2,854,519

TELEPHONE SYSTEM INCLUDING LINE IDENTIFYING MEANS

Filed April 18, 1956

9 Sheets-Sheet 5

Sept. 30, 1958 B. A. HARRIS 2,854,519

TELEPHONE SYSTEM INCLUDING LINE IDENTIFYING MEANS

Filed April 18, 1956 9 Sheets-Sheet 7

Sept. 30, 1958 B. A. HARRIS 2,854,519

TELEPHONE SYSTEM INCLUDING LINE IDENTIFYING MEANS

Filed April 18, 1956 9 Sheets-Sheet 9

1

2,854,519

TELEPHONE SYSTEM INCLUDING LINE IDENTIFYING MEANS

Ben A. Harris, Rochester, N. Y., assignor to General Dynamics Corporation, Rochester, N. Y., a corporation of Delaware Application April 18, 1956, Serial No. 578,952

26 Claims. (Cl. 179—18)

Figure 1:
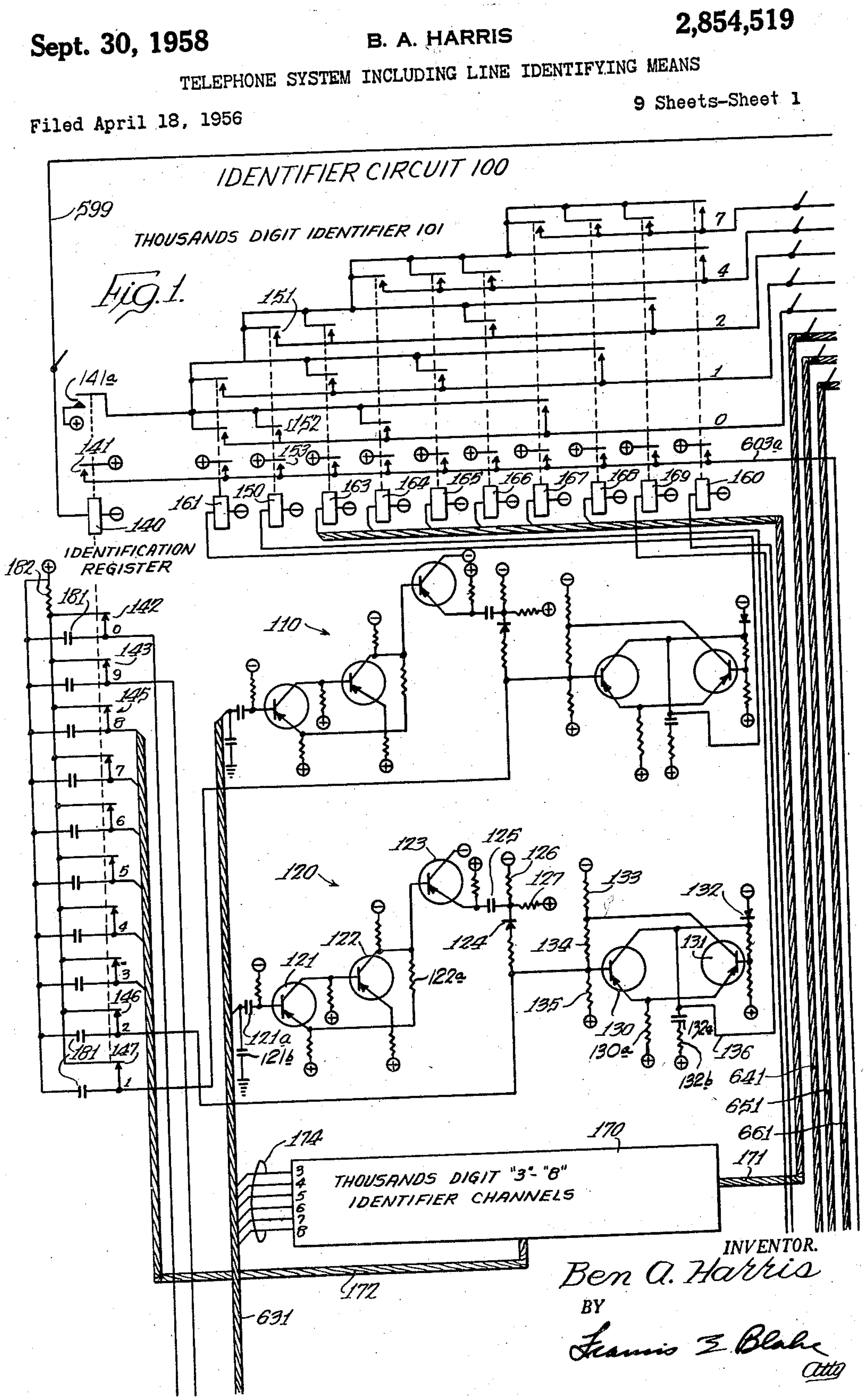
Figure 2:
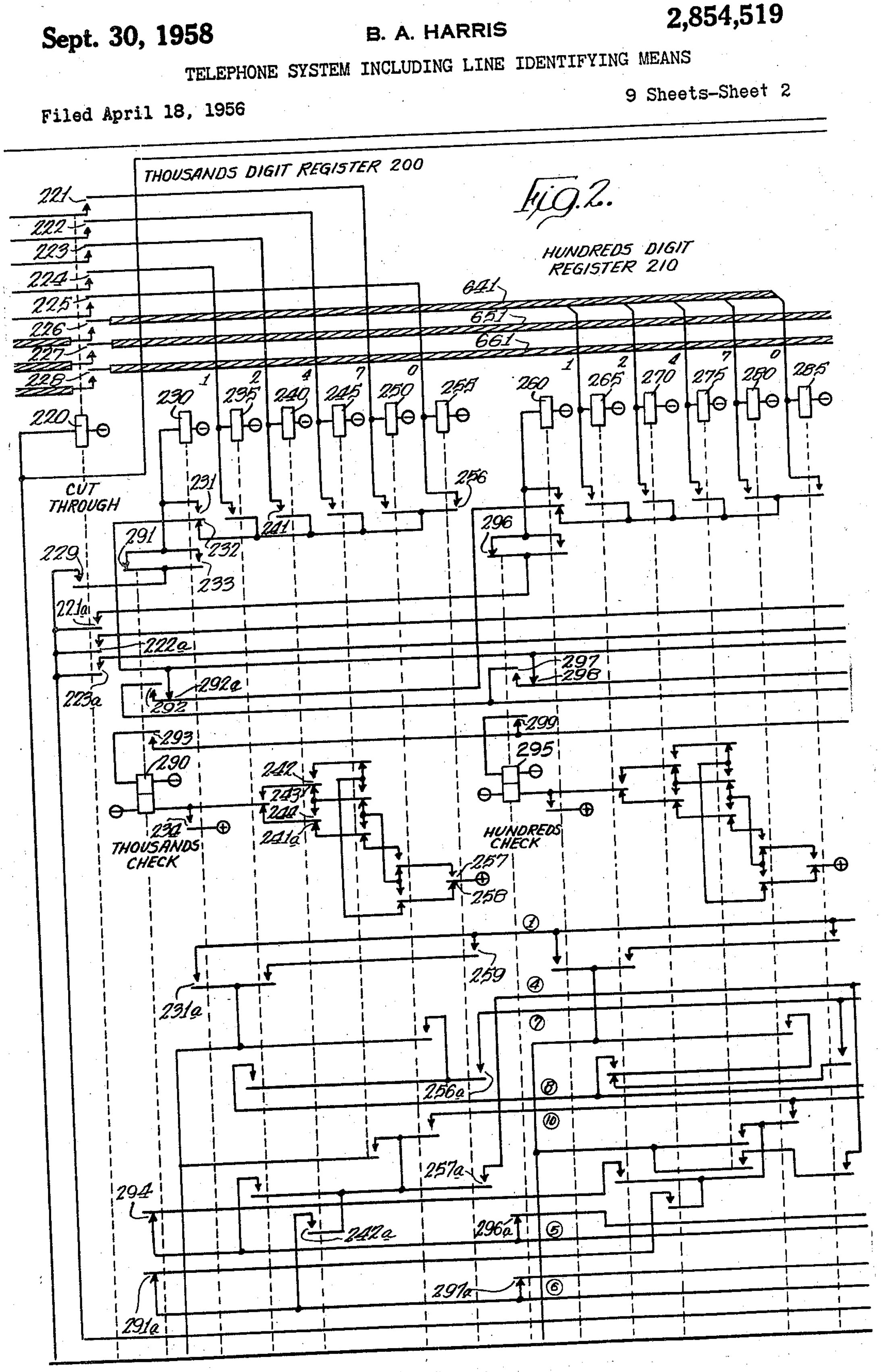
Figure 3:
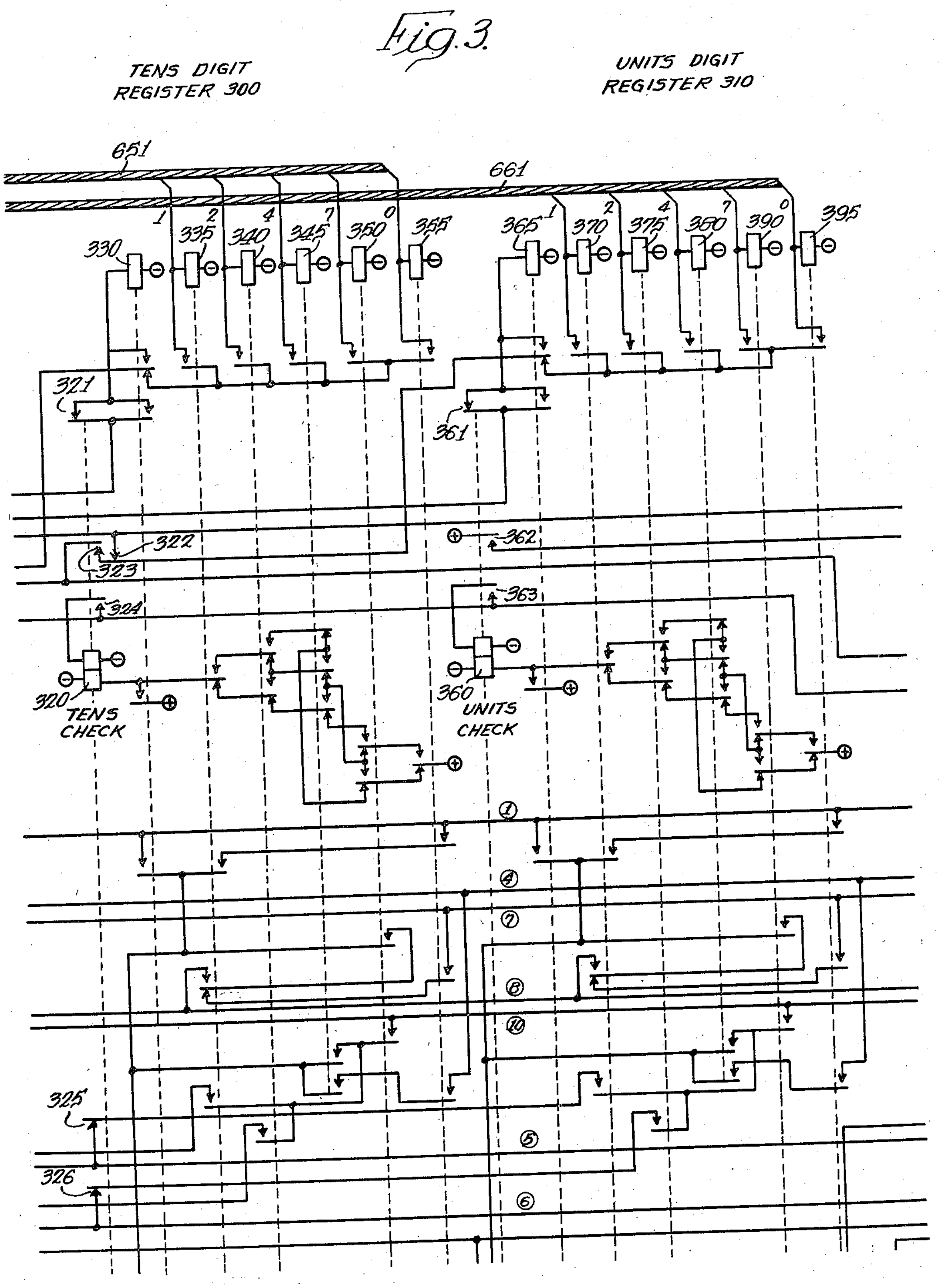
Figure 4:
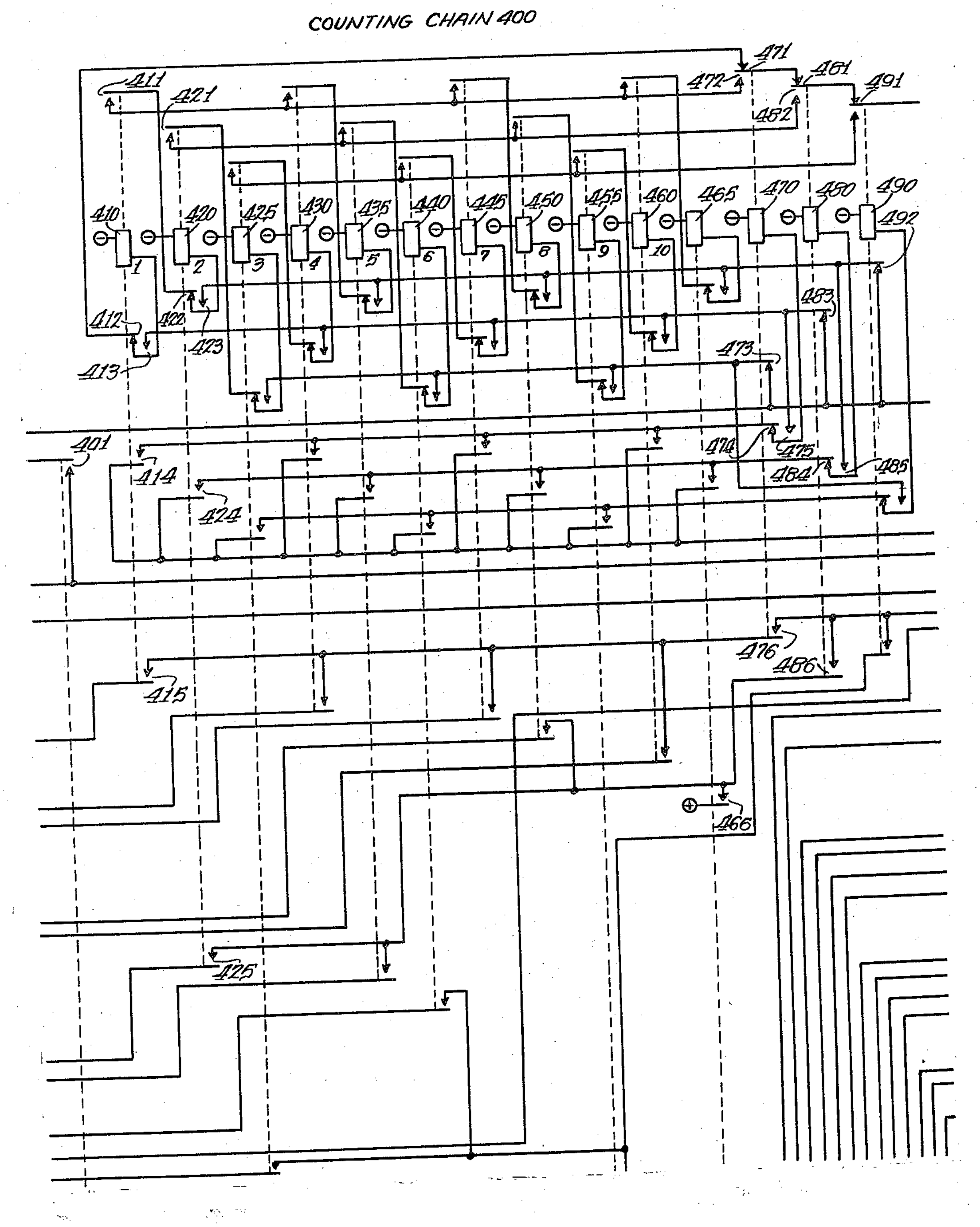
Figure 5:
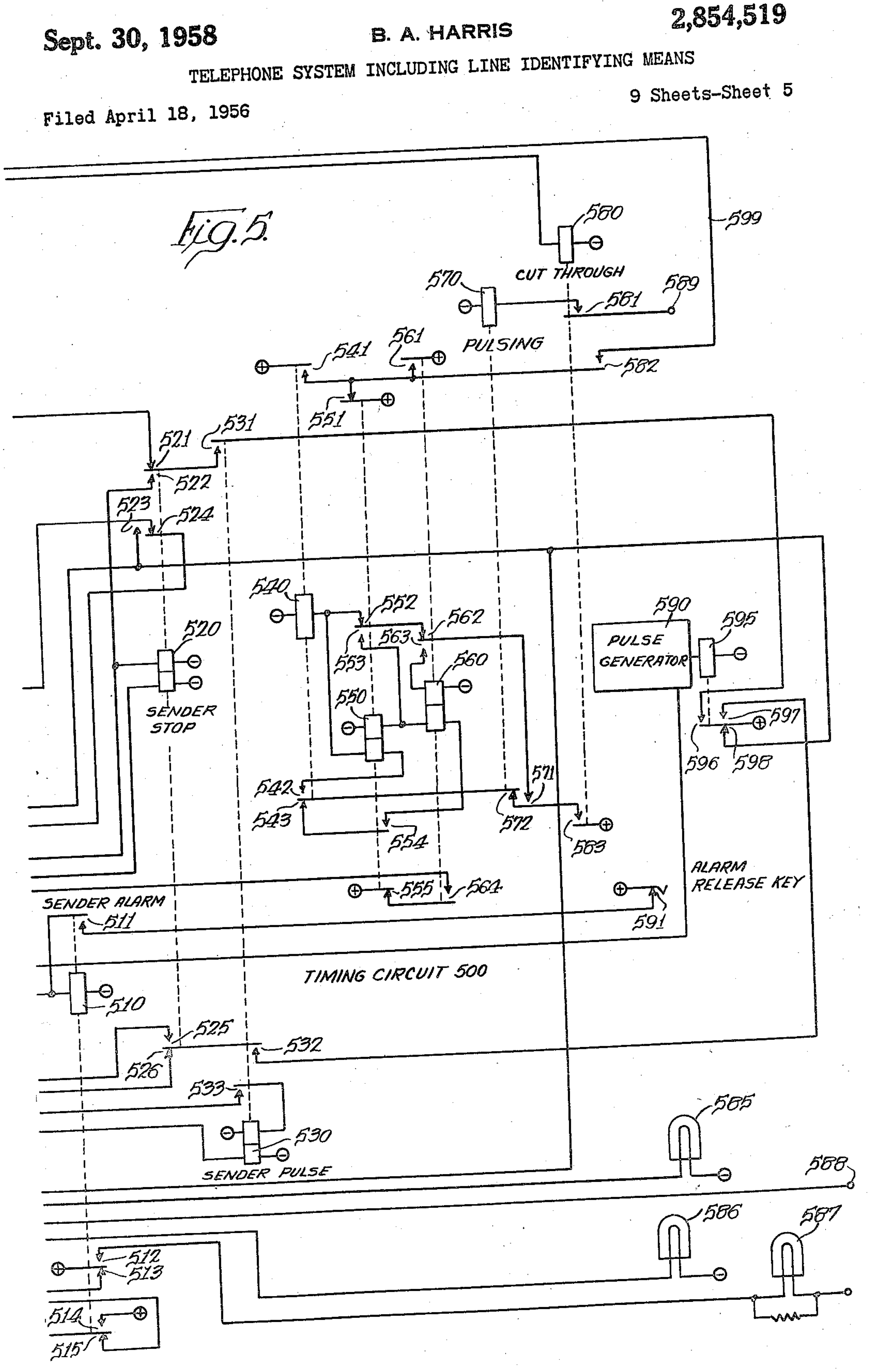

This invention relates to a telephone system and, more particularly, to a telephone system including line identifying means having register sender means.

In automatic toll ticketing systems and in other different types of systems, it is desirable to be able to automatically identify the calling line and party associated with an extended connection. Many prior systems utilizing various operational techniques have been evolved in the past for accomplishing this function, but many of these are not as efficient as would be desirable in the senses of the amount of relay and electronic equipment required and of the speed and reliability of their performance under the adverse operating conditions often encountered in actual service. More particularly, much of this prior equipment includes means for locking all or a certain portion of the identifying equipment out of service when the equipment fails to supply a complete line designation within a single cycle of operation, thereby reducing the traffic handling capabilities of the system. These failures may be due to intermittent phenomena, such as transient voltage disturbances, so that a correct identification could be obtained if repeated attempts are made to identify the line before placing any of the equipment in an alarm condition.

Accordingly, one object of the present invention is to provide a telephone system including new and improved line identifying means which are automatically operable through a predetermined number of cyclic line identifying operations.

Another object is to provide improved apparatus for registering digital information.

Another object is to provide an improved register sender of an economical circuit arrangement.

A still further object is to provide a line identification system including electronic components, the output effectiveness of which is controlled in accordance with the correct storage of coded digital information.

Another object is to provide a register in a line identifying system having control means for making a predetermined number of attempts to store information in the register.

Another object is to provide a line identification system having common detecting means and a plurality of register means in which sequential association of the register means with the detecting means during successive line identifying operations is arrested until the detecting means are returned to a normal condition following the completion of each line identification operation.

Another object is to provide a calling line identification system including a register sender in which repeated attempts are made to identify a calling line designation following which an arbitrary signal is stored in the register to permit the associated sender to transmit data in accordance with the items of information which have been correctly identified and stored in the register.

In accordance with these and many other objects, an embodiment of the invention, which is particularly adapted for automatic toll ticketing systems including a trunk or adapter circuit having a trunk recorder individually assigned thereto for receiving and storing items of information pertaining to calls placed through the associated circuit, comprises a plurality of identifier senders or register senders, any idle one of which is adapted to be associated with the trunk circuit and its associated trunk recorder under the control of an identifier sender allotter at the point in the extension of a toll call at which the calling line designation information is to be determined. In response to the association of the identifier sender with the trunk circuit and its associated recorder and following the establishment of an effective interconnection between the seized identifier sender and a common identifier circuit, an identification potential is returned over the extended switch train to selectively energize an identification matrix in accordance with the digits forming the designation of the calling line. These signals are detected in the common identifier circuit and converted into two out of five combinational code representations of the digits forming the designation of the calling substation. The information provided by the identifier is stored in the seized identifier sender and, following the completion of the correct coded storage of this information in the identifier sender and the release of all of the detecting components in the common identifier circuit, the identifier circuit and the allotter are released. The identifier sender thereupon transmits signals representing the stored digits through the associated trunk or adapter circuit to be recorded in the trunk recorder to provide a record of the designation of the calling line.

The common identifier circuit includes a plurality of transistorized amplifying and detecting channels having flip-flop output stages which are normally rendered ineffective to transmit signals. In response to the completion of the association of one of the identifier senders with the common identifier circuit, the output of the identifier circuit is rendered effective to deliver coded signals for storage in the associated identifier sender. Each of the digit storage or register means in the seized identifier sender is provided with an individual code check means which is operated if a proper two out of five combinational code is stored in the associated register. In the event that a proper two out of five combinational code is not stored in any given one of the registers in the seized identifier sender, the code check means operates in conjunction with timing means to render the output of the common identifier circuit ineffective, thus releasing the registers in the associated identifier sender, and to then render the output of the identifier circuit effective, thus making a second attempt to store proper code combinations in the registers in the seized identifier sender. If the second attempt to store digital information in the identifier sender fails, the identifier sender provides an alarm indication and stores an arbitrary signal in the improperly operated register or registers.

In response to either the completion of the storage of the arbitrary signal in one or more of the registers or in response to the completion of the storage of a complete calling substation designation in the identifier sender, the code check means are sequentially released to render each of the individual registers sequentially effective to control the cyclic operation of sender means associated therewith, thereby to control the transmission of digit representing signals to the associated trunk recorder. By this multiple use of the check relays for checking the correct registration of digits, for initiating a repeat attempt to store information in the identifier sender, and for controlling the sequential association of the registers with the sender means, the amount of equipment required in the identifier sender is materially reduced.

Figures 6, 10:
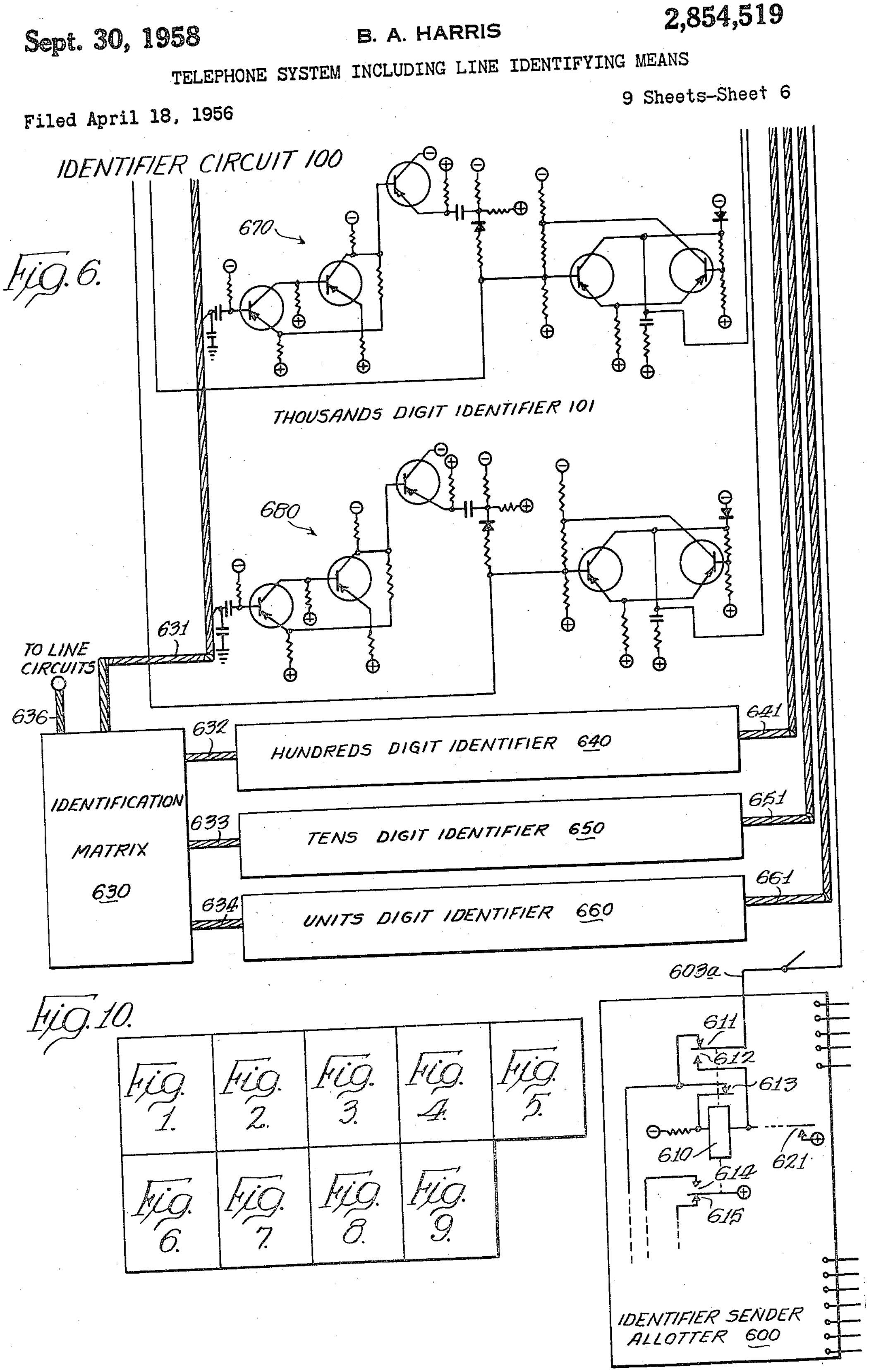

Many other objects and advantages of the present invention will become apparent from the ensuing description of an illustrative embodiment thereof in the course of which reference is made to the accompanying drawings in which:

Figs. 1 to 9, inclusive, illustrate the details of an identifier circuit and an identifier sender circuit in conjunction with certain components of an automatic toll ticketing system; and Fig. 10 is a block diagram disclosing the manner in which Figs. 1 to 9, inclusive, are positioned adjacent each other to form a complete circuit diagram of an automatic line identifying system forming an embodiment of the present invention.

In general, the automatic calling line identifying system of the present invention is particularly adapted for use in conjunction with automatic toll ticketing systems which may be of the type disclosed in the copending application of B. A. Harris and M. A. Clement, Serial No. 536,579, filed September 26, 1955, which is assigned to the same assignee as the present application. In toll ticketing systems of the type disclosed in this application, items of information pertaining to toll calls are automatically collected in conjunction with the extension and establishment of a telephonic connection and are recorded on a trunk recorder which is adapted to store items of information pertaining to a plurality of calls. However, it is apparent that the automatic calling line identifying means of the present invention could easily be utilized in conjunction with those types of automatic toll ticketing installations in which the items of information pertaining to only a single call are collected and stored for subsequent use in controlling a recording instrumentality.

In a typical system of the type described in the above identified application, the establishment of a toll telephonic connection is initiated by the extension of a switch train to an adapter circuit or a trunk circuit 720 which is adapted to control the collection and storage of items of information pertaining to the toll call in a trunk recorder 710 which is individual thereto. The trunk recorder 710 provides a record of the items of information pertaining to a plurality of toll calls in a reproducible form for subsequent use in controlling a recording instrumentality which provides permanent records of these items of information. This recorder may be of any type well known in the art, but preferably is of the type disclosed in the copending application of Howard S. Gleason, Serial No. 378,209, filed September 3, 1953, which is assigned to the same assignee as the present application. As disclosed therein, the trunk recorder utilizes an endless length of magnetic tape having a mark pulse head and a space pulse head disposed adjacent contiguous portions of the tape to define two separate channels for receiving information. The mark pulse head receives a train of pulses representing the value of a digit to be stored, and the space pulse head receives control pulses at spaced intervals for separating successive groups of mark pulses representing successive items of digital information. In order to provide means for advancing the magnetic tape a step by step driving mechanism is incorporated in the trunk recorder 710 which is operated under the control of the trunk or adapter circuit 720 following the recording of each pulse on the magnetic tape to advance the tape for receiving the next pulse to be recorded thereon.

In extending a toll call which is to be ticketed, the calling subscriber first dials a series of digits for extending the switch train to the called subscriber. Concurrently with repeating these digits over the switch train to remote switching equipment, the trunk or adapter circuit 720 produces a series of mark and space pulses for storing the designation of the called subscriber on the magnetic tape of the trunk recorder 710. In response to the receipt of answering supervisory signals indicating the completion of the call to the called substation, a common clock and calendar circuit is rendered effective to supply groups of mark and space pulses to the trunk recorder 710 under the control of the trunk or adapter circuit 720 representing the date and time of filing the call.

The operation of the automatic calling line identifying means is preferably initiated in response to the completion of the storage of the date and time information, although these items of information may conveniently be provided at other times during the extension of the toll call or at the completion thereof. When the calling substation is to be identified, an identifier sender allotter 600 (Fig. 6), which may be of the type disclosed in the above identified Harris et al. copending application or of the type disclosed in the copending application of F. A. Morris, Serial No. 575,789, filed April 3, 1956, which application is assigned to the same assignee as the present application, is placed in operation to associate an idle one of a plurality of identifier senders, such as that shown in Figs. 2 to 5, inclusive, and 7 to 9, inclusive, of the drawings with the calling trunk or adapter circuit 720 by controlling the selective operation of a trunk finder switch 700 which is individual to the illustrated identifier sender. Incident to the association of the identifier sender with the trunk circuit 720, the identifier sender is also associated with an identifier circuit 100 (Figs. 1 and 6), which is common to all of the identifier senders located in a given office or area. The completion of the association of the seized identifier sender with both the identifier circuit 100 and the trunk circuit 720 initiates the application of an identification potential over the extended switch train to a terminal which is individual to the calling substation. This identification potential is further extended by a conductor individual to the calling line through a cable 636 to an identification matrix 630.

The signal thus supplied to the identification matrix 630, which is of the type disclosed in the above identified copending Harris et al. application, selectively energizes a four element impedance cluster to provide marking conditions on a single conductor in each of a plurality of cables 631, 632, 633, and 634 representing the values of the thousands, hundreds, tens, and units digits, respectively, of the designation of the calling substation. The output cables from the common identification matrix 630 are connected to the input of the common identifier circuit 100 and, more particularly, to a thousands digit identifier 101, a hundreds digit identifier 640, a tens digit identifier 650, and a units digit identifier 660, respectively.

The alternating current identification potential extended to the identifier circuit 100 is amplified and detected in each of the identifiers 101, 640, 650, and 660 to provide two out of five combinational code marking on output leads which extend to a thousands digit register 200, a hundreds digit register 210, a tens digit register 300, and a units digit register 310 in the seized identifier sender, thereby operating these registers to store, on a two out of five code basis, the values of the digits forming the designation of the calling substation. Following the correct coded storage of this information in the identifier sender, the identifier circuit 100 is released and, in response thereto, the identifier sender allotter 600 is rendered effective to control the association of another identifier sender with both the identifier circuit 100 and with a trunk circuit smiliar to the trunk circuit 720 to identify a calling substation involved in a subsequently placed toll call.

Following the release of the common identifier circuit 100, the identifier sender sequentially transmits groups of mark pulses separated by space pulses by sequentially operating a counting chain 400 driven by a pulse generator 590 under the sequential control of the thousands digit register 200, the hundreds digit register 210, the tens digit register 300, and the units digit register 310. In response to the completion of the transmission of the stored data representing the designation of the calling substation, the trunk finder switch 730 is operated to release the association between the identifier sender and the trunk or adapter circuit 720.

Following the completion of the storage of the calling line information in the trunk recorder 710, the trunk or adapter circuit 720 operates to provide the recorder 710 with information relating to the duration of the connection and, in some instances, information pertaining to the rate at which the charge is to be computed for the toll call. Following the completion of the storage of this information, the trunk circuit 720 is released incident to a release of the extended switch train, and the trunk recorder 710 together with the associated trunk circuit 720 are then capable of being seized and utilized in extending additional toll calls and in recording the items of information pertaining thereto.

IDENTIFIER CIRCUIT 100

The identifier circuit 100 (Figs. 1 and 6) is selectively energized by the four signals supplied by the identification matrix 630 representing the values of the thousands, hundreds, tens, and units digits of the directory number of the calling substation, and the circuit amplifies and detects these alternating current signals to operate four output coding relays. Each of these operated relays represents the value of one of the digits of the directory number of the calling substation and provides two out of five combinational code marking conditions representing the related digit of the designation of the substation. The identifier circuit 100 stores these identified digits in four groups of register relays in the associated identifier sender, and these register relays control the transmission of signals to the trunk recorder in accordance with the values thereof. The identifier circuit is provided with control means which normally render the output of the identifier circuit 100 inoperative but which are operated in response to the association of the identifier with an idle identifier sender to render the output of the identifier circuit 100 effective to control the selective operation of the register relays. The output control means are further controlled by the identifier sender so that, in the event that a complete identification is not stored in the associated identifier sender, the control means are released and again operated to momentarily block the transmission of signals from the identifier circuit and to then render the identifier output effective to again transmit signals to the identifier sender in an attempt to store a complete identified designation therein.

As indicated above, the identifier circuit 100 comprises a thousands digit identifier 101, a hundreds digit identifier 640, the tens digit identifier 650, and the units digit identifier 660. Each of these identifiers includes ten identical amplifying and detecting channels and ten associated flip-flop output stages which are connected to ten output coding relays. A single one of the ten amplifying and detecting channels in each of the identifiers is selectively energized by the alternating current identification potential provided over the input cables 631, 632, 633, and 634 by the identification matrix 630, and, accordingly, a single output coding relay in each of the identifiers is operated to establish two out of five combinational code marking conditions representing the value of the digit determined by each of the individual identifier circuits.

Assuming that the calling substation involved in the typical toll call described above is identified by the designation "2345," the "2" representing output conductor in the thousands digit cable 631, the "3" representing conductor in the hundreds digit output cable 632, the "4" manifesting conductor in the tens digit output cable 633, and the "5" manifesting conductor in the units digit output conductor 634 are all provided with a relatively low amplitude alternating current signal by the identification matrix 630 as a representation of the designation of the calling substation. The ten marking conductors comprising the thousands digit output cable 630 representing the thousands digits "1" to "9," inclusive, and "0" in the thousands denominational order are selectively coupled to the input of ten amplifying and detecting channels forming the thousands digit identifier 101. More specifically, the conductors representing the thousands digits "1," "2," "9," and "0" are connected to the input of amplifying and detecting channels 110, 120, 670, and 680, and the similar group of conductors 174 representing the thousands digits "3" to "8," inclusive, are connected to six similar amplifying and detecting channels indicated generally as 170.

The alternating current potential provided by the identification matrix 630 representing the thousands digit "2" is coupled to the base electrode of a first input amplifier transistor 121 through a coupling condenser 121a which has a negligible reactance to the frequency of the identification potential, the coupling condenser 121a serving to block any direct current signals. A condenser 121b is provided for bypassing transient voltages to ground to prevent the application thereof to the input of the amplifier 121. The output of the amplifier 121 is directly coupled to a second amplifying transistor 122, a portion of the output of which is degeneratively returned through a resistor 122a to the emitter electrode of the first transistor 121. This feedback is utilized to minimize gain variations in the two stages of amplification due to variations in transistor characteristics and variations in the ambient temperature.

The output of the transistor 122 is coupled to the base electrode of a transistor 123 which acts as a buffer amplifier. The transistor 123 is connected in a cathode follower configuration so that the output thereof is supplied through a coupling condenser 125 to one element of a rectifier 124, this terminal of the rectifier 124 normally being maintained at a small negative potential by a voltage divider including a pair of series connected resistors 126 and 127.

The rectifier 124, together with a condenser 181, form an integrator for operating the output stage of the channel 120 only in response to a sustained application of the alternating current identification potential to the input of this channel. More specifically, each of the channels in the thousands digit identifier 101 is provided with a condenser 181, one plate of which is connected to ground and the other plate of which is connected to a rectifier similar to the rectifier 124. In the normal condition of the identifier circuit 101 prior to the initiation of an identification operation, this other plate of each of the condensers 181 is connected to ground through a relatively low value resistor 182 through a plurality of normally closed contacts 142, 143, 146, and 147, and a group of contacts 145, the contacts 146 serving to connect the condenser 181 associated with the channel 120 to ground. Accordingly, the common resistance 182 maintains all of the condensers 181 in a normally discharged condition.

When one of the identifier senders associated with the common identifier circuit is in condition to receive digital information from the identifier circuit 100, the identification potential is supplied to the identification matrix 630, as described above, the output of the identifier 100 is connected through to the input of the associated identifier sender, and ground is supplied to a conductor 599 to operate an identification register relay 140 in the thousands digit identifier 100 and similar relays in the identifiers 640, 650, and 660. The operation of the relay 140 closes a plurality of contacts 141 and 141a and opens the contacts 142, 143, 145, 146, and 147. Closing the contacts 141a provides ground for an encoding contact tree forming a part of the identifier 101. Closing the contacts 141 applies ground to a conductor 603a which extends to the allotter 600. Opening these contacts removes the low resistance shunt around the plurality of condensers 181. When the signal amplified by the transistors 121 and 122 in the channel 120 is coupled through the buffer amplifier formed by the transistor 123, current flows through the rectifier 124 during the negative half cycles of the amplified wave so that the condenser 181 in the channel 120 is charged. The RC constants of the charging circuit for the condenser 181 are such that, after approximately five to six cycles, a sufficient negative voltage is provided across the condenser 181 to initiate the operation of the output stage of the channel 120.

Referring now more specifically to the output stage, this comprises a bi-stable circuit including a pair of cross connected transistors 130 and 131 having a common emitter load 130*a*. In the normal condition of this bi-stable circuit, the transistor 131 is conducting heavily or is saturated so that a negative potential of approximately three volts is applied to the emitter electrodes of the transistors 130 and 131. The base electrode of the transistor 130 is normally maintained at a lesser negative potential of approximately two volts by a voltage divider including a plurality of series connected resistors 133, 134, and 135. Since the base electrode of the transistor 130 is positive with respect to the emitter electrode of this transistor, the transistor 130 is normally cut off. However, when the condenser 181 associated with the channel 120 becomes charged sufficiently negative, the base electrode of the transistor 130 becomes negative with respect to the emitter electrode, and the transistor 130 begins to conduct heavily. Conduction in the transistor 130 provides an effective positive bias for the transistor 131 so that this transistor is cut off. Accordingly, in response to sustained charging of the condenser 181 following the operation of the identification register relay 140, the bi-stable output circuit is reversed from its normal position so that the transistor 130 is saturated and the transistor 131 is cut off.

The shift in the conductive condition of the output stage of the channel 120 is utilized to selectively operate one of a plurality of output coding relays 150, 160, 161, and 163—169 forming a portion of the thousands digit identifier 101. When the transistor 130 begins to conduct, the electron flow to the collector electrode of the transistor 130 through the operating winding of a digit "2" output coding relay 150 and a conductor 136 operates the relay 150 to close a plurality of contacts 151, 152, and 153, thereby to provide a registration of the thousands digit "2" in the thousands digit identifier 101. The resistance of the winding of the relay 150 together with the other relays in the thousands digit identifier 101 is preferably of the same magnitude as the resistor 133 so as to provide a balanced load for the transistors 130 and 131. Further, in order to avoid improper operation of the output stage including the transistors 130 and 131 due to transient voltages and pickup from the circuit including the output coding relays, a shunting rectifier 132 and a series RC circuit including a condenser 132*a* and a resistor 132*b* are provided.

The closure of the contacts 153 connects an additional source of ground to the conductor 603*a*. The closure of the contacts 151 and 152 establishes two out of five combinational code marking by extending ground from the closed contacts 141*a* to the code marking conductors designated as "0" and "2" by the legends appearing adjacent thereto in the upper right hand portion of Fig. 1 of the drawings. The establishment of marking conditions on these two conductors provides a two out of five combinational code representation of the thousands digit "2."

In a similar manner, the hundreds digit identifier 640, the tens digit identifier 650, and the units digit identifier 660 amplify and detect the alternating current potentials supplied thereto from the identification matrix 630 so that two out of five combinational code marking conditions are established in a plurality of output cables 641, 651, and 661 representing the values of the hundreds, tens, and units digits of the calling substation, these identifiers being identical to and operating in a manner similar to the thousands digit identifier 101.

In order to restore the identifier circuit, including the thousands digit identifier 101, to a normal condition, ground is removed from the conductor 599 to release the relay 140 so that the contacts 141 and 141*a* are opened and the contacts 142, 143, 145, 146, and 147 are closed. The opening of the contacts 141*a* removes ground from the digit representing path extending to the "0" and "2" conductors. The opening of the contacts 141 removes one source of ground from the conductor 603*a*, but ground is maintained thereon at the closed contacts 153. The closure of the contacts 146 places the low magnitude resistance 182 in parallel with the condenser 181 to dissipate the charge thereon and to prevent the further charging of this condenser in response to rectification of signals supplied to the rectifier 124, these signals continuing until such time as the identification potential is removed from the input to the transistor 121. The removal of the negative voltage from the condenser 181 associated with the channel 120 renders the base electrode of the transistor 130 positive with respect to the emitter electrode thereof so that the transistor 130 is cut off. This removes the effective positive bias provided between the base and emitter electrodes of the transistor 131 so that this transistor goes to current saturation. Rendering the transistor 130 substantially nonconductive in the collector circuit thereof interrupts the current flow through the operating winding of the output coding relay 150 so that this relay releases to open the contacts 151, 152, and 153. The opening of the contacts 151 and 152 opens the marking paths extending to the input of the associated identifier sender, ground previously having been removed from these paths by the opening of the contacts 141*a*. The opening of the contacts 153 removes ground from the holding conductor 603*a*.

In a similar manner, the removal of ground from the conductor 599 releases the operated components in the identifiers 640, 650, and 660 to restore them to normal. In disconnecting all of the sources of ground in all of the identifiers 101, 640, 650, and 660 from the common lead 603*a*, the allotter 600 is signaled that the common identifier circuit has been returned to normal and is available to be used in identifying additional calls. However, as long as ground is maintained on the lead 603*a*, a signal for the allotter is provided indicating that the identifier circuit 100 has not been completely cleared and returned to normal.

IDENTIFIER SENDER

As indicated above, the dentifier sender (Figs. 2–5 and 7–9) is associated with the common identifier circuit 100 to receive signals representing the values of the four digits of the directory number of a calling subscriber which are stored in the thousands, hundreds, tens, and units digit registers 200, 210, 300, and 310, respectively. The identifier 100 and the matrix 630 are then released and the sender means in the identifier sender, including the counting chain 400, are sequentially rendered effective to transmit groups of mark pulses to an associated trunk recorder, such as the recorder 710, so that the designation of the calling substation is stored therein. The identifier sender further includes code check means which are selectively operated in accordance with the correct coded storage of the digital information supplied by the identifier circuit 100 and includes further means controlled by the code check means for making repeated attempts to receive this information from the circuit 100 or for storing an arbitrary signal in one or more of the registers if repeated attempts do not result in the transmission of a proper coded digit registration to the identifier sender.

The identifier sender is provided with an individually associated trunk finder switch 700 for associating the identifier sender with a trunk or adapter circuit, such as the circuit component 720, and its individually associated trunk recorder 710. The operation of the trunk finder switch 700 to perform the association is controlled by the identifier sender allotter 600, which may be of the type disclosed in the above identified copending Harris et al. application. As indicated above, the association of the identifier sender with both the trunk circuit 720 and with the common identifier circuit 100 preferably takes place following the completion of the recording of date and time information in the trunk recorder 710, although this association may be initiated at any other suitable time.

1. *Normal operation of the identifier sender*

To initiate operation of the trunk finder switch 700, as disclosed in detail in the copending Harris et al. application, the trunk or adapter circuit 720 extends start ground over a common allotter start conductor 721 to the identifier sender allotter 600. This ground places the identifier sender allotter 600 in operation so that if the identifier sender is in an idle condition and has been preselected by the switching means in the identifier sender allotter 600, ground is extended over a guard lead 601*a* to complete an operating circuit for a start relay 910 which includes a plurality of normally closed contacts 812, 892, 515, and 903*a*. Operation of the start relay 910 opens a plurality of contacts 911 and 913 and closes a plurality of contacts 912, 914, and 915.

The opening of the contacts 913 interrupts a point in the operating circuit for a reset magnet 810 of the trunk finder switch 730. The closure of the contacts 914 interconnects an electric lamp 586 with a terminal 588 which is connected to a supervisory circuit to provide a visible indication that the identifier sender has been seized.

The operation of the start relay also initiates the timing interval during which the complete registration of the digits of the designation of the calling substation and the transmission of impulses in accordance therewith must be completed. More specifically, the opening of the contacts 911 interrupts a normally complete circuit for discharging a pair of grounded condensers 881 and 882 including a series resistor 883, a plurality of normally closed contacts 904 and 911, and the contacts 923. The concurrent closure of the contacts 912 completes an operating circuit for an alarm relay 920 extending from the condensers 881 and 882 through the resistor 883 and the closed contacts 904 and 912 to the operating winding of the alarm relay 920 which is connected to grounded battery. Upon the completion of this circuit, a current flows through the operating winding of the alarm relay 920 to charge the condensers 881 and 882 at a time rate which is determined by the magnitude of the condensers 881 and 882 and the value of the series resistor 883, when considered in conjunction with the resistance of the winding of the alarm relay 920. Preferably these circuit constants are so adjusted that a large enough charging current flows through the winding of the alarm relay 920 to maintain it operated for an interval of from three to four seconds.

The operation of the alarm relay opens a plurality of contacts 921 and 923 and closes a plurality of contacts 922, 924, and 925. The closure of the contacts 924 completes a parallel branch of the above described operating and holding circuit for the alarm relay 920 which bypasses the contacts 911 and 912 controlled by the start relay 910. The opening of the contacts 923 interrupts an additional point in the discharging circuit for the condensers 881 and 882, and the closure of the contacts 922 prepares an operating and holding circuit for a spill relay 900. The opening of the contacts 921 interrupts, at an additional point, a previously opened circuit extending to the operating winding of a sender alarm relay 510. The closure of the contacts 925 interconnects a Y stop conductor 603 extending from the identifier sender allotter 700 with a brush 703 of the trunk finder switch 700.

Referring back to the preceding operation of the start relay 910 to close the contacts 915, the closure of these contacts extends ground through a plurality of normally closed contacts 771, 761, and 784 to be applied to a pulse assist conductor 607 extending to the identifier sender allotter 600. In response to the application of ground through this conductor, a pulse assist relay in the allotter 600 causes the sequential operation and release of an X motor magnet 770 forming a portion of the trunk finder switch 700 by intermittently applying ground to a conductor 609 which is connected to the operating winding of the motor magnet 770 through a pair of normally closed Y off normal contacts 875, the intermittent operations of the motor magnet 700 opening and closing the interrupter contacts 771. In this manner, the pulse assist relay in the identifier sender allotter 600 and the motor magnet 770 of the trunk finder switch 700 are alternately and intermittently operated to advance a plurality of wipers 701 to 706, inclusive, controlled thereby in one direction relative to a group of bare wire multiples 708 to which the trunk finder switch 700 has access. Incident to the first step of movement of these wipers in the first direction, a plurality of X off normal springs are operated so that a pair of contacts 871 are opened and a pair of contacts 872 are closed. The closure of the contacts 872 prepares an operating circuit for the reset magnet 810 which extends to the open contacts 913. The opening of the contacts 871 interrupts a circuit extending to a pair of normally closed and grounded contacts 513 to remove ground from an all senders busy conductor 602*a*, thereby to indicate that the identifier sender has been seized.

The above described intermittent operation of the trunk finder switch 700 under the control of the motor magnet 770 continues until such time as one of the wipers 705 or 706 is moved into engagement with a bare wire multiple or contact to which ground has been connected by the trunk or adapter circuit 720. This ground is forwarded over one of a pair of conductors 605 and 606 to operate an X stop relay in the identifier sender allotter 600. The operation of this relay together with the release of an X stop relay both connects the operating winding of a Y stop relay with a conductor 603 and transfers the contacts controlled by the pulse assist relay in the allotter 600 to a path including a conductor 608 which extends to the operating winding of a Y motor magnet 760 in the trunk finder switch 700.

Thereafter, the pulse assist relay in the identifier sender allotter 600 and the motor magnet 760 alternately operate and release under the control of the interrupter contacts 761 controlled by the motor magnet 760 so that the wipers 701 to 704, inclusive, are moved in a second direction relative to the bank 708 of bare wire multiples. Incident to the first step of movement in this second direction, a Y off normal spring arrangement is operated to open a plurality of contacts 875 and 876 and to close a plurality of contacts 873 and 874. The opening of the contacts 875 interrupts the above described operating path for the X motor magnet 770, and the concurrent closure of the contacts 874 interconnects the conductor 609 with the wiper 704 and with a pair of normally closed overflow springs 781. The closure of the contacts 873 prepares another alternative operating path for the reset magnet 810, and the opening of the contacts 876 opens the ground circuit for the conductor 602*a* at another point.

The intermittent operation of the motor magnet 760, as described above, advances the wipers 701 to 704, inclusive, in the second direction relative to the bank 708 of bare wire multiples until such time as the wiper 703 moves into engagement with a bare wire multiple to which ground has been applied by the trunk or adapter circuit 720, thereby indicating that the trunk finder switch 700 has been advanced to the position individual to the trunk circuit 720. The ground applied to the wiper 703 is extended through a plurality of closed contacts 909, 925, and 783 to the Y stop conductor 603, thereby completing an operating circuit for the Y stop relay in the identifier sender allotter 600. Operation of this relay terminates intermittent operation of the Y motor magnet 760 and the pulse assist relay in the allotter 600.

The operation of the Y stop relay in the allotter 600 also initiates the application of the identification potential to the matrix 630 and completes the association of the identifier sender with the identifier circuit 100. As described in detail in the above identified copending Harris et al. application, the identifier sender allotter 600 may include two substantially identical components which are utilized to perform allotting operations on odd or even levels. To control the selective application of ground for initiating the application of the identification potential to the identification matrix and for completing the association of the identifier sender with the identifier circuit, the allotter shown in the above identified Harris et al. application includes a relay 4030 which corresponds to a relay 610 in the identifier sender allotter 600. When the allotting of an idle identifier sender is performed by the odd level allotter, the operation of the Y stop relay in the odd level allotter forwards a shunting ground through a pair of normally closed contacts 613 to prevent operation of the relay 610 during the interval in which the identification operation is being performed so that ground is continuously provided by a pair of normally closed contacts 615 controlled by this relay. Further, shunting ground is provided through a pair of contacts 611 from the conductor 603*a* during the interval that the identifier circuit 100 is in use so as to prevent operation of the relay 610. The ground provided at the closed contacts 615 is extended to the conductor 609 to control the association of the identifier sender with the identifier circuit 100 and to control the application of the identification potential to the matrix 630.

Alternatively, if the allocation of the identifier sender is performed under the control of the even level allotter, the operation of the Y stop relay in the even level allotter closes a pair of contacts 621, thereby to operate the relay 610 to close a plurality of contacts 612 and 614 and to open a plurality of contacts 611, 613, and 615. The opening of the contacts 613 prevents the application of a ground shunt around the operating winding of the relay 610, and the closure of the contacts 612 interconnects the conductor 603*a* extending to the identifier circuit 100 with the operating winding of the relay 610 so that this relay is held operated until ground is removed from the conductor 603*a* at the completion of the cycle of operation of the identifier circuit 100, thereby preventing a change in the operational status of the allotter 600 until such time as the identifier circuit 100 is completely released. The opening of the contacts 615 prevents the application of ground to the conductor 609 under the control of the odd level allotter, and the concurrent closure of the contacts 614 forwards ground to the conductor 609 under the control of the even level allotter. Accordingly, the operation of the Y stop relay in the identifier sender allotter 600 in response to the completion of the stepping movements of the trunk finder switch 700 renders the relay 610 effective to control the application of ground to the conductor 609 under the further control of either the odd or even level allotter provided in the identifier sender allotter 600.

The ground applied to the conductor 609 is extended through the closed contacts 874 to be applied to the wiper 704. This ground is extended through the bank 708 of bare wire multiples to an identification relay in the trunk or adapter circuit 720 which, upon operation, applies the identification potential to the identification matrix 630 so that this matrix 630 selectively energizes the input leads extending to the common identifier circuit 100 in accordance with the values of the four digits forming the designation of the calling substation. In addition, the ground applied to the conductor 609 is extended through a pair of normally closed overflow springs 781 to be applied to the operating windings of a pair of cut-through relays 220 and 580 in the seized identifier sender, thereby to operate these relays.

The operation of the cut-through relay 220 closes a plurality of contacts 221 to 225, inclusive, a plurality of groups of contacts 226 and 228, inclusive, and a plurality of contacts 229, 221*a*, 222*a*, 223*a*, 721, and 722. The closure of the contacts 722 prepares a signaling path extending to a no-identification conductor 725 which is common to all of the trunk or adapter circuits with which the identifier sender may be associated and which is selectively grounded as an indication that the identifier sender has failed to receive any digital information from the identifier circuit 100. The closure of the contacts 721 applies ground to a terminal which is connected to a supervisory circuit to provide an indication that the identifier sender has been associated with the identifier circuit 100. The closure of the contacts 221*a*, 222*a*, 223*a*, and 229 prepare operating circuits for a plurality of asterisk relays 230, 260, 330, and 365 in the registers 200, 210, 300, and 310.

The closure of the contacts 221 to 225, inclusive, interconnects the output marking conductors controlled by the coding output relays in the thousands digit identifier 101 with a plurality of relays 235, 240, 245, 250, and 225 forming the thousands digit register 200 in the identifier sender to prepare these relays for selective two out of five combinational code operation in accordance with the value of the identified thousands digit of the calling substation. In a similar manner, the closure of the contact groups 226, 227, and 228 interconnects the conductors in the cables 641, 651, and 661 with a plurality of register relays 265, 270, 275, 280, and 285 forming the hundreds digit register 210, a plurality of relays 335, 340, 345, 350, and 355 forming the tens digit register 300, and a plurality of relays 370, 375, 380, 390, and 395 forming the units digit register 310. Accordingly, the operation of the cut-through relay 220 completes the association of the seized identifier sender with the common identifier circuit 100 and prepares the associated identifier sender for receiving the digital information which is to be stored therein under the control of the identifier circuit 100.

As described above, the ground supplied on the conductor 609 is extended to the operating winding of a second cut-through relay 580, the operation of which closes a plurality of contacts 581, 582, and 583. The contacts 583 prepare an operating circuit for a timing circuit 500 including a plurality of timing relays 540, 550, and 560. The closure of the contacts 581 interconnects the operating winding of a pulsing relay 570 with a terminal 589 which is provided with momentary ground pulses at one-half second intervals. The closure of the contacts 582 extends ground from a pair of closed and grounded contacts 551 to the conductor 599 which is connected to the operating winding of the identification register relay 140 in the thousands digit identifier 101 and the similar relays in the identifiers 640, 650, and 660. The application of ground to this conductor operates the identification register relays so that the identifiers are rendered effective to selectively operate the output coding relays to establish marking conditions representing the values of the digits forming the designation of the calling substation.

In the typical call described above, the calling substation is identified by the designation "2345" so that, as further described in detail above, the output coding relay 150 in the thousands digit identifier 101 is operated to close the contacts 151, 152, and 153. The closure of the contacts 153, together with the prior closure of the contacts 141 in response to the operation of the identification register relay 140, applies ground to the conductor 603*a* so that the operative status of the relay 610 in the identifier sender allotter 600 cannot be varied. More specifically, in the event that the identifier sender has been allotted by the even level allotter portion of the allotter 600, the contacts 621 have previously been closed to operate the relay 610. The closure of the contacts 612 due to operation of the relay 610 permits the ground applied to the locking or holding conductor 603*a* to be extended to the operating winding of the relay 610 to maintain this relay operated until such time as both the decoding relay 150 and the identification register relay 140 in the thousands digit identifier 101 are released. In a similar manner, the selective operation of the relays corresponding to the relay and the operated output coding relays in the identifiers 640, 650, and 660 provide holding ground on the conductor 603*a* to maintain the relay 610 operated until the identifier 100 is completely released. In a similar fashion, in the event that the odd level allotter portion of the identifier sender allotter 600 is utilized in controlling the association of the identifier sender with the common identifier circuit 100, the ground applied to the conductor 603*a* is extended through the normally closed contacts 611 and the closed contacts 613 to provide a ground shunt around the operating winding of the relay 610, thereby to prevent the operation thereof until such time as the identifier circuit 100 has been completely released following the establishment of the digital data in the identifier sender.

Referring back to the operation of the digit "2" output coding relay 150, the closure of the contacts 151 and 152 extends the marking ground provided at the contacts 141*a* which are closed by the operation of the relay 140 to the marking paths designated by the digits "0" and "2" forming a two out of five combinational code representation of the thousands digit "2". The ground applied to these two conductors is extended to the operating windings of the relays 240 and 255 in the thousands digit register 200, thereby causing the operation of these relays to register this digit in the thousands digit register 200. The operation of the relay 240 closes a plurality of contacts 241, 242, 244, 242*a*, and 741, and opens a plurality of contacts 243 and 241*a*. The operation of the relay 255 closes a plurality of contacts 256, 257, 259, 256*a*, 257*a*, and 756 and opens a pair of contacts 258. The closure of the contacts 241 and 256 prepares holding circuits for the operated relays extending through a plurality of normally closed contacts 232 and 524 to a pair of normally opened contacts 401.

Figure 7:
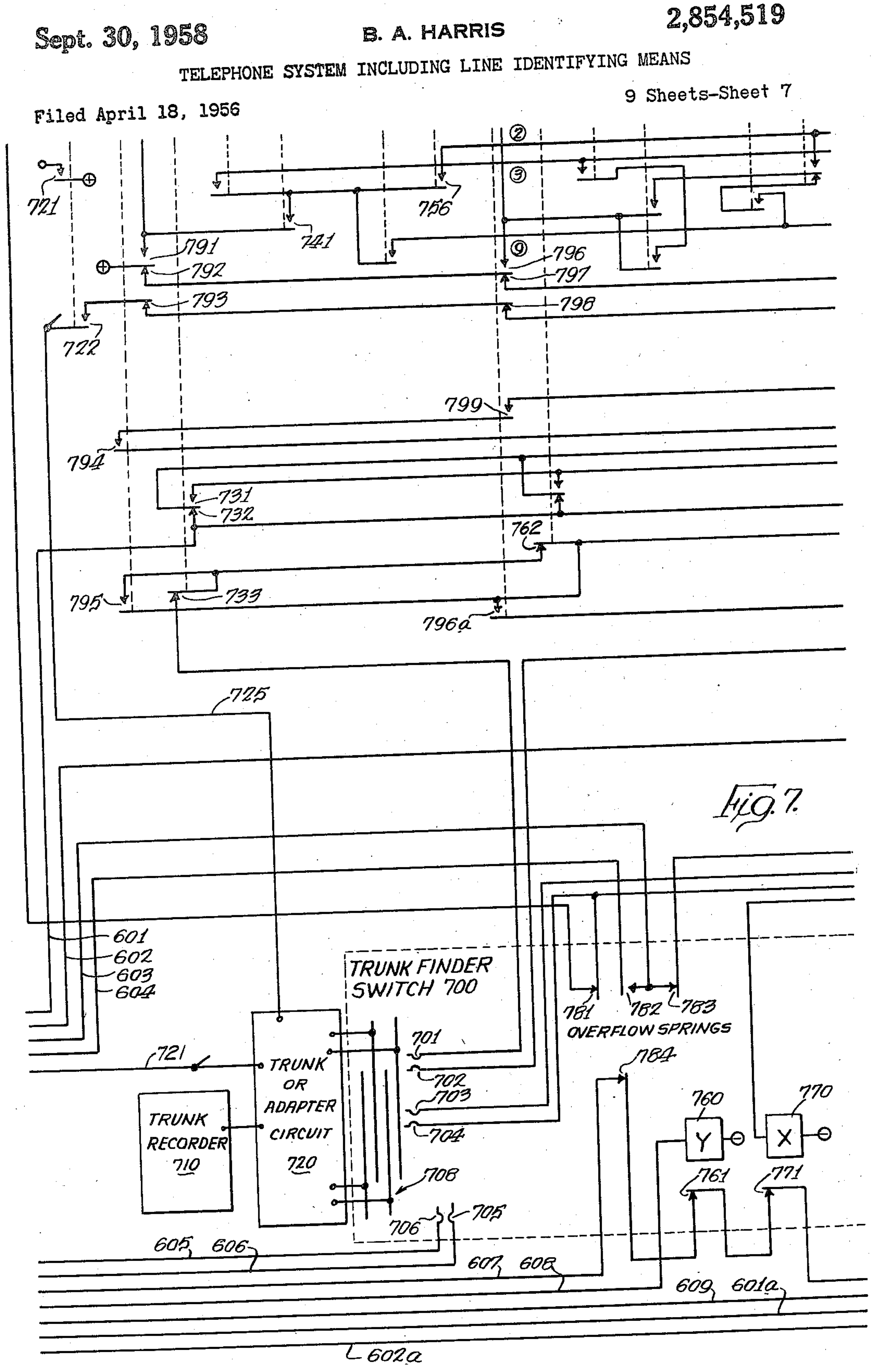
Figure 8:
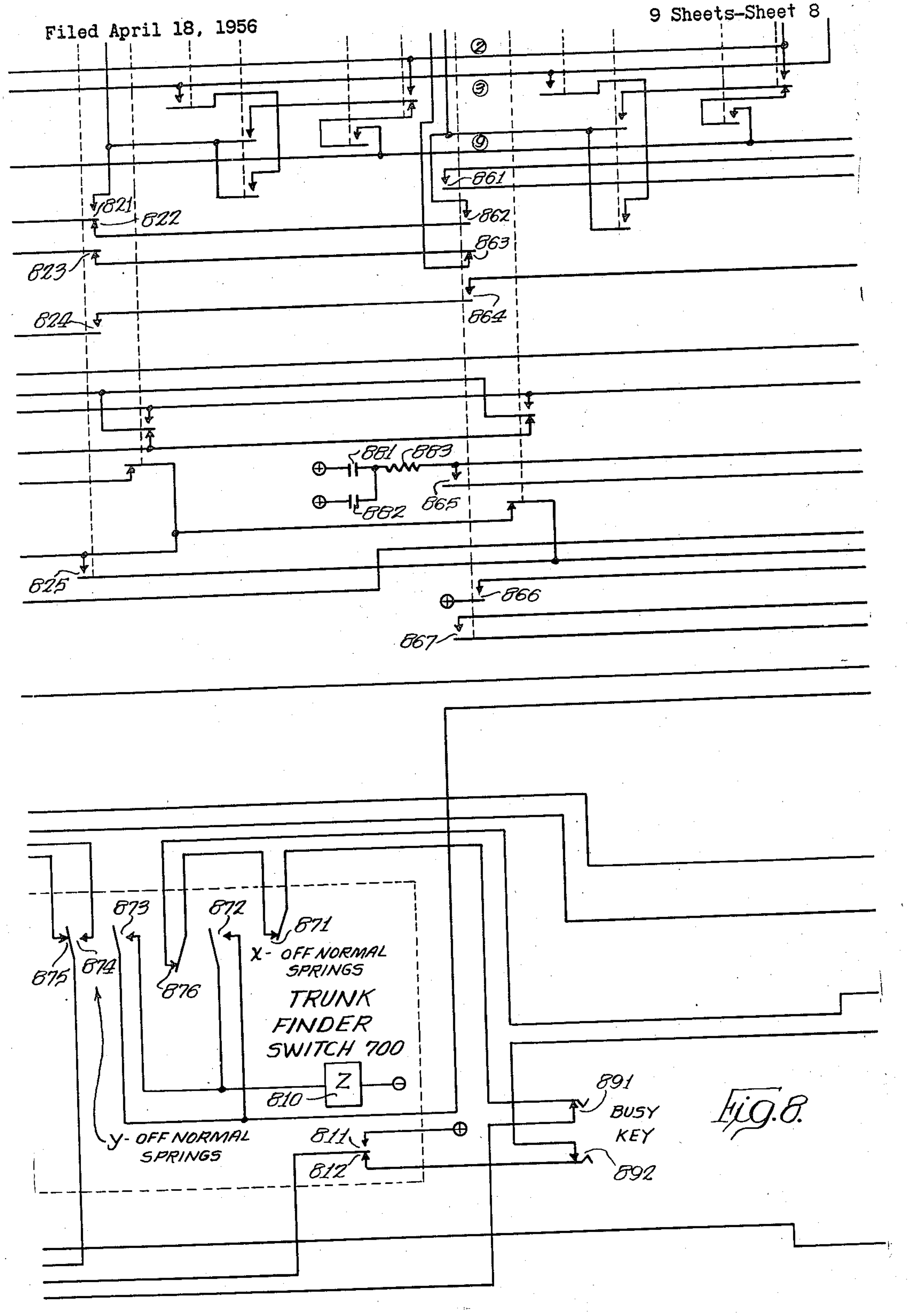
Figure 9:
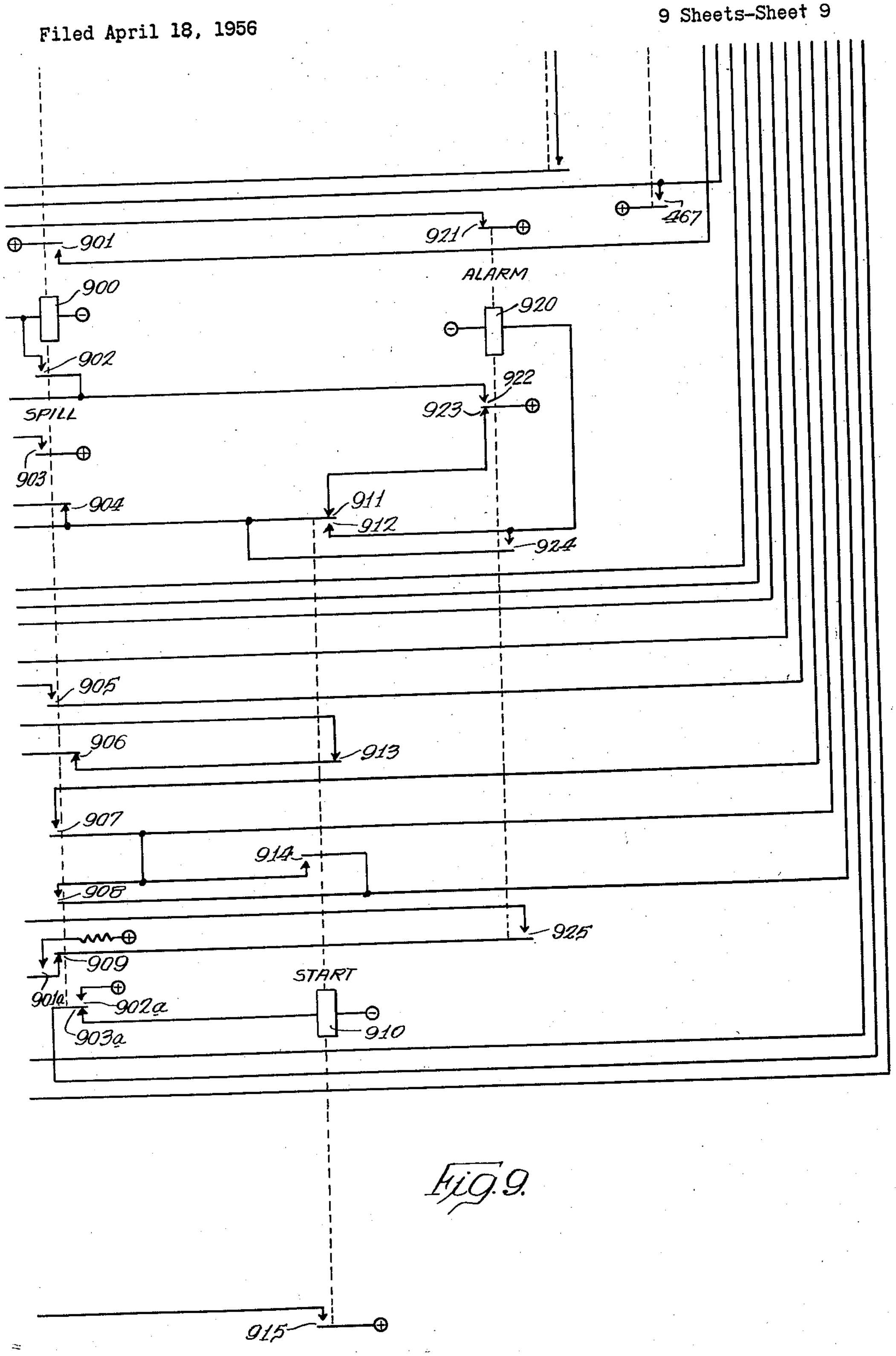

In order to provide a marking path for controlling the operation of the counting chain 400 in accordance with the value of the registered thousands digit "2", the closure of the contacts 741 and 756 prepares a path extending to the digit "2" marking conductor shown in Figs. 7 and 8 of the drawings and indicated by an encircled digit "2" positioned adjacent thereto. The selective operations of the contacts 242*a*, 257*a*, 256*a*, and 259 controlled by the relays 240 and 255 prepare marking paths extending to other conductors for controlling the counting chain 400, but none of these paths are completely prepared inasmuch as the operation of two of the five code storage relays 235, 240, 245, 250, and 255 in the thousands digit register 200 completes a marking path extending to only one of the conductors for controlling the operation of the counting chain 400.

The contacts controlled by the register relays in the thousands digit register 200 also control the selective operation of a thousands check relay 290, which relay is operated only in the event that two relays in the group of relays 235, 240, 245, 250, and 255 are operated. In the event that one, three, four, or five of these relays are operated, thereby indicating that an incorrect two out of five combinational code has been supplied by the identifier circuit 100, the relay 290 is not operated. However, the operation of the relays 240 and 255, in closing the contacts 257 and 244, completes a circuit for extending ground to the lower operating winding of the thousands check relay 290, thereby to operate this relay as an indication that a correct two out of five combinational code designation has been stored in the thousands digit register 200. The remaining contacts 242, 243, 241*a*, and 258 controlled by the relays 240 and 255 perform no useful function in being utilized in operating paths for the thousands check relay 290 which are associated with digits other than the digit "2".

In operating, the thousands check relay opens a plurality of contacts 291, 292*a*, 294, 291*a*, 792, and 793 and closes a plurality of contacts 292, 293, 791, 794, and 795. The closure of the contacts 293 prepares a holding path for the thousands check relay 290 extending to a pair of normally open contacts 522. The opening of the contacts 291 interrupts a portion of an operating circuit for an asterisk relay 230 in the thousands digit register 200. The closure of the contacts 292 prepares a portion of a holding circuit for the plurality of relays forming the hundreds digit register 210, and the opening of the contacts 292*a* disconnects these relays from a holding circuit extending through a pair of closed contacts 524 to a pair of open contacts 401. The opening of the contacts 291*a* and 294 opens backup circuits which, if interrupted, would result in the application of ground to improper digital conductors for controlling the operation of the counting chain 400.

The closure of the contacts 791 extends marking ground through the closed contacts 741 and 756 and the "2" manifesting conductor to the contacts controlled by the relays forming the counting chain 400, thereby to prepare the counting chain 400 for a cycle of operation in accordance with the value of the stored thousands digit. The concurrent opening of the contacts 792 interrupts a circuit for applying ground to the marking conductor selected by the relays in the hundreds digit register circuit 210. The opening of the contacts 793 interrupts a point in the above described circuit for applying ground to the no-identification conductor 725 and thereby indicates that at least one digit has been stored in the identifier sender, i. e. the thousands digit. Since at least one digit has been correctly stored in the identifier sender, a no-identification signal is not to be provided to the trunk circuit 720. The closure of the contacts 794 prepares a portion of an operating circuit for a spill relay 900 extending to the closed and grounded contacts 922, and the closure of the contacts 795 prepares a portion of a path for extending mark pulses to the wiper 701 of the trunk finder switch 700.

Accordingly, in response to the correct storage of the thousands digit "2" in the thousands digit register 200, the register relays establish a single control or marking path representing the value of the stored digit for controlling the operation of the counting chain 400 and operate the thousands check relay 290. The operation of this relay extends ground to the path prepared by the selective operation of the register relays, interrupts the signaling path extending to the no-identification conductor 725 to indicate the correct storage of at least a single digit, prepares a portion of an operating path for the spill relay 900, and prepares a path for extending the group of mark pulses representing the value of the stored thousands digit to the mark pulse recording means in the trunk recorder 710.

In a similar manner, the ground applied to the "1" and "2" marking conductors in the cable 641 by the hundreds digit identifier 640 selectively operates the register relays 265 and 270 to store the hundreds digit "3" in the hundreds digit register 210. The selective operation of these relays performs the same function as the operated relays in the thousands digit register 200 so as to complete an operating circuit for a hundreds check relay 295 and to prepare a path for extending marking ground to the control path or conductor designated by the encircled digit "3" in Figs. 7 and 8 of the drawings, thereby to indicate to the counting chain 400 that a group of mark pulses representing the digit "3" is to be transmitted as a representation of the value of the hundreds digit of the designation of the calling substation.

The completion of the operating circuit for the hundreds check relay 295 operates this relay to close a plurality of contacts 297, 299, 796, 799, and 796a and to open a plurality of contacts 296, 298, 296a, 297a, 797, and 298. The closure of the contacts 299 prepares a holding circuit for the upper winding of the hundreds check relay 295 extending to the open contacts 522. The opening of the contacts 296 interrupts a point in an operating circuit for the asterisk relay 260 in the hundreds digit register 210. The contacts 297 and 298 form a make-before-break contact arrangement so that the closure of the contacts 297 prepares a holding circuit for the relays in the tens digit register 300 which extends to the open contacts 401 prior to the opening of the contacts 298 to interrupt the initially prepared holding circuit extending to the contacts 401 through the normally closed contacts 524.

The opening of the contacts 296a and 297a performs the same functions as the contacts 294 and 291a in interrupting backup circuits in the marking paths controlled by the register relays in the hundreds digit register 210 and extending to the contacts controlled by the counting chain 400. The closure of the contacts 796 prepares a circuit for extending ground to the marking path representing the hundreds digit "3," which circuit is interrupted at the open contacts 792. The concurrent opening of the contacts 797 interrupts a circuit for extending ground to the marking paths controlled by the relays in the tens digit register 300 and the units digit register 310. The opening of the contacts 798 interrupts an additional point in the circuit for applying ground to the no-identification conductor 725, thereby indicating that the hundreds digit of the calling substation designation has been correctly stored in the register 210. The closure of the contacts 799 prepares an additional point in the operating circuit for the spill relay 900, and the closure of the contacts 796a prepares a path for applying mark pulses representing the value of the hundreds digit to the mark pulse wiper 701 of the trunk finder switch 700.

To store the value of the tens digit of the designation of the substation in the typical call described above, the tens digit identifier 650 applies ground to the "4" and "0" marking conductors in the cable 651 to operate the register relays 345 and 355 in the tens digit register 300. The operation of these relays prepares a path for applying ground to the marking conductor designated by the encircled digit "4" (Fig. 3) and also completes an operating circuit for the tens check relay 320 to indicate that a correct combinational code designation has been stored in the register 300. The completion of the operating circuit for the tens check relay 320 operates this relay to open a plurality of contacts 321, 322, 325, 326, 822, and 823 and to close a plurality of contacts 323, 324, 821, 824, and 825.

The closure of the contacts 324 prepares a holding circuit for the upper winding of the tens check relay 320, and the opening of the contacts 321 interrupts an operating circuit for the asterisk relay 330 in the tens digit register 300. The make-before-break contact arrangement involving the contacts 323 and 322 extends the holding circuit for the register relays in the units digit register 310 to the normally open contacts 401, while the opening of the contacts 325 and 326 interrupts backup paths in the control path arrangement controlled by the register relays in the tens digit register 300 in the same manner as the contacts 294 and 291a.

The closure of the contacts 821 prepares a path interrupted at the open contacts 792 and 797 for applying ground to the "4" manifesting conductor extending to the counting chain 400, and the concurrent opening of the contacts 822 interrupts a path for forwardling ground to the conductor selected by the operation of the relays in the units digit register 310. The opening of the contacts 823 interrupts an additional point in the circuit for applying ground to the no-indentification conductor 725, and the closure of the contacts 824 prepares an additional portion of the operating circuit for the spill relay 900. The closure of the contacts 825 prepares a path for applying mark pulses representing the value of the tens digit to the wiper 701 of the trunk finder switch 700.

As described above in the illustrative typical call, the units digit identifier 660 applies ground to the marking conductors "4" and "1" in the cable 661 representing the units digit "5" of the designation of the calling substation, and the ground on these conductors operates the register relays 370 and 380 in the units digit register 310. The selective operation of these relays prepares a path extending to the conductor designated by the encircled digit "5" which is open at the contacts 325 and further completes an operating circuit for the units check relay 360.

The operation of the units check relay 360 indicates that a correct two out of five combinational code representation of the value of the identified units digit of the designation of the calling substation has been stored in the units digit register 310. The operation of this relay closes a plurality of contacts 362, 263, 861, 862, 864, 865, 866, and 867 and opens a plurality of contacts 361 and 863. The closure of the contacts 363 prepares a holding path for the upper winding of the units check relay 360, and the opening of the contacts 361 interrupts an operating path for the asterisk relay 365 in the units digit register 310. The closure of the contacts 362 extends ground to the open contacts 401, thereby to provide a source of holding ground for the operated relays in the registers 200, 210, 300, and 310. This holding ground is also utilized by the counting chain 400.

The closure of the contacts 861 prepares a portion of an operating circuit for the sender alarm relay 510, which circuit is interrupted at the open contacts 921. The closure of the contacts 862 prepares a path interrupted at the open contacts 822 for applying ground to the marking or control path selected by the operation of the relays 370 and 380. The opening of the contacts 863 interrupts an additional point in the circuit for applying ground to the no-identification conductor 725 to indicate that the value of the units digit of the designation has been correctly stored in the register 310. The closure of the contacts 865 completes a shunt around the contacts 904 controlled by the spill relay 900 to maintain the operating circuit for the alarm relay 920 intact when the spill relay 900 is subsequently operated. The closure of the contacts 866 extends holding ground to a pair of normally open contacts 533 controlled by a sender pulse relay 530. The closure of the contacts 867 prepares an operating circuit for the sender pulse relay 530 which extends from a pair of closed and grounded contacts 598 to a pair of open contacts 905.

The closure of the contacts 864 completes an operating circuit from the closed contacts 922 for the spill relay 900, and, since this operating path includes the contacts 794, 799, 824, and 864 controlled by each of the plurality of check relays 290, 295, 320, and 360, the operation of the spill relay 900 indicates that all of the items of information pertaining to the designation of the calling substation have been correctly stored in the identifier sender so that the identifier circuit 100 and consequently the identifier sender allotter 600 can be released for use in conjunction with the identification of calling subscribers involved in subsequently placed toll calls. More specifically, the operation of the spill relay closes a plurality of contacts 401, 901, 902, 903, 905, 907, 908, 901a, and 902a and opens a plurality of contacts 904, 906, 909, and 903a. The closure of the contacts 902 completes an obvious holding circuit for the spill relay 900 extending to the closed and grounded contacts 922.

The closure of the contacts 903 applies ground to a circuit which extends the ground to an alarm conductor 601 terminating in the allotter 600 in the event that any of the asterisk relays 230, 260, 330, and 365 are operated. However, none of the asterisk relays are operated when all of the necessary digital information is provided in the identifier sender and, accordingly, all of the plurality of contacts similar to a pair of contacts 731 controlled by the asterisk relay 230 are open. The opening of the contacts 904 interrupts the above described charging path for the condensers 881 and 882 which maintain the alarm relay 920 operated, but the opening of these contacts does not release this relay since the prior closure of the contacts 865 completes another charging circuit. The opening of the contacts 906 interrupts an additional point in the operating circuit for the reset magnet 810 of the trunk finder switch 730, and the closure of the contacts 908 provides a shunt around the closed contacts 914 controlling the energization of the lamp 586. The closure of the contacts 907 interconnects a monitor lamp 585 with the terminal 588 to provide a visible indication of the initiation of the pulsing operation of the identifier sender. The closure of the contacts 401 provides ground over the above described paths including the contacts 524, 292, 297, and 323 for holding the operated relays in the registers 200, 210, 300, and 310, respectively.

The closure of the contacts **902*a* applies ground to the guard conductor 601*a* extending to the identifier sender allotter 600 to mark the identifier sender as busy, and the concurrent opening of the contacts 903*a* interrupts the above described operating circuit for the start relay 910 so that this relay releases to close the contacts 911 and 913 and to open the contacts 912, 914, and 915. The opening of the contacts 915 removes ground from the pulse assist conductor 607, and the opening of the contacts 914 opens the above described path for interconnecting the lamp 586 with the terminal 588, these two components remaining connected through the closed contacts 908. The opening of the contacts 912 interrupts the above described operating path for the alarm relay 920, but this path remains complete through the previously closed contacts 924. The closure of the contacts 911 prepares a holding circuit for the alarm relay 920, and the closure of the contacts 913 prepares a point in the operating circuit for the reset magnet 810, which path is interrupted at the open contacts 906**.

Since the operation of the spill relay 900 indicates that all of the necessary digital information has been received from the identifier circuit 100, the release thereof and consequently of the identifier sender allotter 600 and of the identification matrix 630 is initiated by the operation of the spill relay 900. More specifically, the opening of the contacts 909 and the closure of the contacts **901*a*, which form a make-before-break contact arrangement, opens the above described path for extending direct ground from the trunk circuit 720 over the wiper 703 to the Y-stop conductor 602 of the identifier sender allotter 600. The concurrent closure of the contacts 901*a* applies resistance ground to the wiper 703 for use in holding certain relay components in the trunk or adapter circuit 720 operated. This resistance ground, however, is not sufficient to mark the bare wire multiple with which the wiper 703 is engaged so that other trunk finder switches, similar to the switch 700, will attempt to seize the trunk or adapter circuit 720**.

As described in detail in the above identified copending Harris et al. application, the removal of ground from the Y stop lead 603 in the identifier sender allotter 600 operates switching means in the identifier sender so that another idle identifier sender similar to the one illustrated in the drawings is preselected for association with the identifier circuit 100 and with a calling trunk circuit, similar to the circuit 720, in response to the next extension of a toll call from a calling subscriber. Incident to this operation, the identifier sender allotter 600 removes ground from the conductor 609 to interrupt the above described operating circuit for the cut-through relays 220 and 580 so that these relays release. The release of the cut-through relay 220 interrupts the interconnection of the digit registers 200, 210, 300, and 310 in the identifier sender with the output from the common identifier circuit 100 and, at the contacts 229, **221*a*, 222*a*, and 223*a*, interrupts the partially prepared circuits for operating the asterisk relays 230, 260, 330, and 365 in these registers. The opening of the contacts 722 interrupts the signaling path extending to the no-identification conductor 725 to prevent the establishment of a no-identification condition in the trunk circuit 720 since a full complement of digits has been stored in the identifier sender. The opening of the contacts 721 terminates the application of ground to the supervisory circuit to indicate that the interconnection between the identifier sender and the common identifier circuit 100** has been terminated.

The release of the cut-through relay 580, in opening the contacts 581, terminates intermittent operation of the pulsing relay 570 under the control of the one hundred and twenty I. P. M. signals, and the opening of the contacts 583 prevents operation of the timing circuit 500 under the control of the pulsing relay 570. The opening of the contacts 582 removes ground from the conductor 599 to release the identification register relay 140 in the thousands digit identifier 101 and the similar relays in the identifiers 640, 650, and 660. The release of the identification register relays renders the outputs of the plurality of identifiers 101, 640, 650, and 660 ineffective so that signals are not transmitted from the common identifier circuit 100, as described above.

In rendering the output stages of the indentifiers 101, 640, 650, and 660 ineffective, the operated output coding relays in each of the identifiers, similar to the operated relay 150, are released to open the prepared paths extending to certain of the relays in the seized identifier sender. In opening the contacts 153 and the other contacts similar thereto and in opening the contacts 141 and the contacts similar thereto, ground is removed from the holding conductor **603*a* to permit the relay 610 in the idetnifier sender allotter 600 to be thereafter controlled by the odd and even allotter portions of the identifier sender allotter 600. Since the ground on the conductor 603*a* which is utilized for holding the relay 610 operated or for maintaining this relay in a released condition is not removed until the last of the output coding relays in the common identifier circuit 100 is released, a positive guard is provided against permitting the identifier sender allotter 600 to complete the association of the identifier circuit 100 with another identifier sender until such time as all of the previously established marking conditions in the common identifier circuit 100 have been removed therefrom. This prevents the establishment of false identifications in subsequent identifier senders due to digital information which may remain in the identifier circuit 100**.

The operation of the spill relay 900 in response to the completion of the storage of the four digits in the registers 200, 210, 300, and 310 also initiates operation of the counting chain 400 to transmit groups of signals representing the values of the four digits stored in the identifier sender. More specifically, the closure of the contacts 905 completes the circuit prepared by the closure of the contacts 867 for operating the sender pulse relay 530. This relay, in operating, closes a plurality of contacts 531, 532, and 533. The closure of the contacts 533 completes the holding circuit for the upper winding of the sender pulse relay 530 which extends to ground through the closed contacts 866 controlled by the units check relay 360. The closure of the contacts 531 interconnects the input of the counting chain 400 with a pair of normally open contacts 596 controlled by a pulse generator relay 595. The closure of the contacts 532 interconnects a pair of normally open contacts 597 controlled by the pulse generator relay 595 with the mark pulse wiper 701 of the trunk finder switch 700 through a circuit including the closed contacts 532, 526, 825, **796*a*, 795, and 733**.

The closure of the contacts 901 in response to the operation of the spill relay 900 applies ground to a pulse generator 590 which may be of the type shown in Fig. 16 of the above identified copending Harris et al. application and which is operative to continuously and cyclically operate and release the pulse generator relay 595 during the period in which ground is applied thereto. The cyclic operation of the pulse generator relay 595 transmits ground or mark pulses to the wiper 701 in accordance with the values of the stored digits, transmits space pulses to the wiper 702 following the transmission of each group of mark pulses, and operates the counting chain 400 in synchronism with the transmission of ground pulses to the wipers 701 and 702.

The counting chain 400 is of a well known conventional type which is illustrated in Figs. 15 to 19 of the drawings of the above identified copending Harris et al. application and the operation of which is described in detail therein. In general, the counting chain 400 includes a plurality of counting relays 410, 420, 425, 430, 435, 440, 445, 450, 455, 460, and 465 representing the digits "1" to "9," inclusive, "0," and and an overflow condition, respectively, which are sequentially operated under the control of the pulse generator relay 595 and in an alternate relationship with three relays 470, 480, and 490 so that, when a number of counting relays in the chain 400 have been operated corresponding to the value of the registered digit, the grounded control or marking path controlled by a selected one of the digit registers 200, 210, 300, and 310 is cut through to the operating winding of a sender stop relay 520, the operation of which terminates cyclic operation of the counting chain 400, conditions the identifier sender for transmitting a space pulse over the wiper 702 to the trunk recorder 710 and resets the counting chain 400 to a normal condition for controlling the application of the next group of mark pulses to the trunk recorder 710.

In the typical call described above, the thousands digit "2" is stored in the register 200 so that the ground provided at the closed contacts 791 is extended through the closed contacts 741 and 756 over the "2" representing conductor to a pair of normally open contacts 425 controlled by the digit "2" counting relay 420 in the counting chain 400. When the pluse generator relay 595 is first operated under the control of the pulse generator 590, the contacts 598 are opened and the contacts 596 and 597 are closed. The opening of the contacts 598 interrupts the above described operating circuit for the sender pulse relay 530, but this relay remains operated over the holding circuit including the closed contacts 533. The closure of the contacts 597 applies ground over the above described bath to the mark pulse wiper 701 to record a first mark pulse in the trunk recorder 710. The closure of the contacts 596 applies ground through the closed contacts 531, 521, 491, 481, 471, and 412 to the operating winding of the digit "1" counting relay 410, thereby operating this relay to close a plurality of contacts 411, 413, 414, and 415, and to open the contacts 412. The contacts 412 and 413 form a make-before-break contact arrangement so that the closure of the contacts 413 prior to the opening of the contacts 412 to interrupt the above described operating circuit completes a holding circuit for the relay 410 which extends to ground through a plurality of closed contacts 483, 524, 401, and 362. The closure of the contacts 411 prepares a portion of an operating circuit for the digit "2" counting relay 420. The closure of the contacts 414 prepare an operating path for the relay 470, and the closure of the contacts 415 interconnects the digit "1" marking conductor controlled by the plurality of digit registers with a path extending to the lower operating winding of the sender stop relay 520, which path is open at a pair of contacts 476.

When the pulse generator 590 releases the relay 595 to open the contacts 596 and 597 and to close the contacts 598, the opening of the contacts 597 removes ground from the mark pulse wiper 701. The opening of the contacts 596 removes ground from the previously interrupted operating path for the digit "1" counting relay 410, and the concurrent closure of the contacts 598 completes the prepared operating path for the relay 470, which path extends through the closed contacts 414 and 474. The operation of the relay 470 opens a plurality of contacts 471, 473, and 474 and closes a plurality of contacts 472, 475, and 476. The opening of the contacts 471 interrupts, at an additional point, the above described operating circuit for the relay 410, and the concurrent closure of the contacts 472 completes the preparation of the operating path for the digit "2" counting relay 420. The opening of the contacts 473, in interrupting a plurality of previously opened holding paths, performs no useful function.

The contacts 474 and 475 form a make-before-break contact arrangement so that the closure of the contacts 475 completes a holding circuit extending to ground through the closed contacts 483, 524, 401, and 362 prior to the opening of the contacts 474 to open the above described operating circuit for the relay 470. The closure of the contacts 476 interconnects the digit "1" marking conductor extended through the closed contacts 415 with the lower operating winding of the sender stop relay 520. However, this relay does not operate at this time inasmuch as ground is not applied to the digit "1" marking conductor by the contacts controlled by the relays forming the thousands digit register 200.

When the pulse generator relay 595 is next operated to close the contacts 596 and 597 and to open the contacts 598, a second ground pulse is applied to the mark pulse wiper 701 to record a second mark pulse in the trunk recorder 710 representing the digit "2." The opening of the contacts 598 interrupts, at an additional point, the previously opened operating circuit for the relay 470. The closure of the contacts 596 completes an operating circuit for the digit "2" counting relay 420 extending through the closed contacts 531, 521, 491, 481, 472, 411, and 422. The operation of the relay 420 closes a plurality of contacts 421, 423, 424, and 425 and opens the contacts 422. The opening of the contacts 422 opens the operating circuit for the relay 420, but the prior closure of the contacts 423 completes a holding circuit extending through a pair of normally closed contacts 492 to the grounded and closed contacts 362. The closure of the contacts 421 prepares a portion of an operating circuit for a digit "3" counting relay 425, and the closure of the contacts 424 prepares an operating circuit for the relay 480. The closure of the contacts 425 interconnects the grounded "2" marking conductor with a pair of normally open contacts 486 controlled by the relay 480.

When the pulse generator relay 595 is released to open the contacts 596 and 597, the above described operating circuit for the digit "2" relay 420 is interrupted at an additional point and the application of ground to the mark pulse wiper 701 is terminated. The closure of the contacts 595 concurrently therewith applies ground through the closed contacts 424 and 484 to operate the relay 480. In operating, this relay opens a plurality of contacts 481, 483, and 484 and closes a plurality of contacts 482, 485, and 486. The contacts 484 and 485 form a make-before-break contact arrangement so that the closure of the contacts 485 to complete a holding circuit extending through the closed contacts 492 maintains the relay 480 operated when the contacts 484 are opened to interrupt the above described operating circuit therefor. The opening of the contacts 481 interrupts, at an additional point, the previously interrupted operating circuit for the digit "2" counting relay 420, and the concurrent closure of the contacts 482 completes an additional portion of an operating circuit for the digit "3" counting relay 425. The opening of the contacts 483 interrupts the holding circuit extending to the operating winding of the digit "1" relay so that this relay releases to open the contacts 411, 413, 414, and 415 and to close the contacts 412. In addition, the opening of the contacts 483 removes the source of holding ground for the relay 470 so that this relay releases to close the contacts 471, 473, and 474 and to open the contacts 472, 475, and 476. The opening of the contacts 476 together with the opening of the contacts 415 disconnects the digit "1" marking conductor from the operating winding of the sender stop relay 520.

The closure of the contacts 486 interconnects the digit "2" marking conductor, which is connected to ground at the closed contacts 791, with the lower operating winding of the sender stop relay 520, thereby operating this relay to open a plurality of contacts 521, 524, and 526 and to close a plurality of contacts 522, 523, and 525. The opening of the contacts 526 interrupts the above described path for applying ground pulses to the wiper 701, and the concurrent closure of the contacts 525 completes a circuit controlled by the pulsing contacts 597 for supplying a ground pulse to the wiper 702, which wiper is connected with means in the trunk or adapter circuit 720 for controlling the recording of a space pulse in the trunk recorder 710. In this manner, the operation of the sender stop relay 520 terminates the application of mark pulses to the trunk recorder 710 and prepares a circuit for transmitting a space pulse to the trunk recorder repesenting the end of the group of thousands digit pulses.

The closure of the contacts 522 prepares a holding circuit extending to the upper winding of the sender stop relay 520, and the concurrent opening of the contacts 521 interrupts the above described pulsing path for operating the counting chain 400. The contacts 523 and 524 form a make-before-break contact arrangement in which the contacts 523 are first closed to complete a holding circuit for the operated register relays 240 and 255 in the thousands digit register 200 and for the operated relays 420 and 480 in the counting chain 400 extending to the closed and grounded contacts 598. Thereafter, the contacts 524 are opened to interrupt the previous holding circuits extending to ground through the closed contacts 362 and 401.

Accordingly, when the pulse generator 590 next operates the pulse generator relay 595 to close the contacts 596 and 597 and to open the contacts 598, the closure of the contacts 597 supplies ground to the wiper 702 to record a space pulse in the trunk recorder 710 immediately following the group of mark pulses representing the value of the thousands digit of the designation of the calling substation. The closure of the contacts 596 extends ground through the closed contacts 531 and 522 to energize the upper winding of the sender stop relay 520 to maintain this relay operated. This ground is further extended through the closed contacts 293, 299, 324, and 363 to maintain the check relays 290, 295, 320, and 360 operated. The opening of the contacts 598 removes ground from the holding circuit for the relays 480 and 420 so that these relays release to open the contacts 425 and 486, among others. The opening of these contacts disconnects the lower operating winding of the sender stop relay 520 from ground, but the sender stop relay does not release at this time due to the prior completion of a holding circuit extending to the upper winding thereof.

The removal of ground occasioned by the opening of the contacts 598 also opens the holding circuit extending through the closed contacts 232, 241, and 256 to the operating windings of the register relays 240 and 255, thereby permitting these relays to release to restore the contacts controlled thereby to their normal position. In releasing, the register relays open the above described path for forwarding ground from the closed contacts 791 to the digit "2" marking conductor and open the above described operating circuit for the thousands check relay 290. However, the check relay does not release at this time due to the holding circuit completed therefor through the closed contacts 293, 522, 531, and 596.

When the relay 595 next releases to open the contacts 596 and 597 and to close the contacts 598, the opening of the contacts 597 terminates the application of ground to the space pulse wiper 702 to terminate the recording of the space pulse. The opening of the contacts 596 removes holding ground from the upper winding of the sender stop relay 520 so that this relay releases to close the contacts 521, 524, and 526 and to open the contacts 522, 523, and 525. The closure of the contacts 526 prepares the pulsing path extending to the mark pulse wiper 701, and the concurrent opening of the contacts 525 interrupts the above described path extending to the space pulse wiper 702, thereby conditioning the identifier sender to transmit another group of mark pulses. The opening of the contacts 522 interrupts, at an additional point, the above described holding circuit for the sender stop relay 520 and the plurality of check relays, and the concurrent closure of the contacts 521 prepares a portion of the pulsing circuit for the counting chain 400. The opening of the contacts 523 interrupts, at an additional point, the above described temporary holding circuit for the counting chain 400, and the closure of the contacts 524 extends holding ground from the closed contacts 362 to the holding circuit for the plurality of relays forming the counting chain 400. Accordingly, the release of the sender stop relay 520 conditions the counting chain 400 for an additional cycle of operation during which mark pulses are transmitted to the trunk recorder 710 under the control of the marking conditions established on the paths controlled by the counting chain 400 and which is selectively terminated in the operating winding of the sender stop relay 520.

The opening of the contacts 596 also removes ground from the upper winding of the thousands check relay 290 so that this relay releases, the lower winding thereof previously having been deenergized in response to the release of the operated register relays in the thousands digit register 200. In releasing, the thousands check relay 290 closes the contacts 291, 292*a*, 294, 291*a*, 792, and 793 and opens the contacts 292, 293, 791, 794, and 795. The opening of the contacts 293 interrupts the above described holding circuit for the thousands check relay at an additional point, and the closure of the contacts 291 prepares a portion of an operating circuit for the asterisk relay 230, which circuit is interrupted at the open contacts 229 controlled by the released cut-through relay 220. The opening of the contacts 292 and the closure of the contacts 292*a* transfers the holding circuit for the operated relays 265 and 270 in the hundreds digit register 210 from the ground provided at the closed contacts 362 and 401 to the same source of holding ground which is extended through the closed contacts 524. The closure of the contacts 294 and 291*a* extends the marking conductors representing the digits "5" and "6" to the contact assemblies controlled by the relays in the hundreds digit register 210.

The opening of the contacts 791 removes ground from the contact assemblies controlled by the relays in the thousands digit register 200, and the concurrent closure of the contacts 792 extends ground through the closed contacts 796 so that the conductor representing the digit "3" is connected to ground through the contacts 796 and 792. The closure of the contacts 793 prepares a portion of the circuit for applying ground to the no-identification conductor 725, but this circuit is interrupted at the open contacts 722. The opening of the contacts 794 interrupts the above described operating circuit for the spill relay 900, but this relay remains operated through the holding circuit provided at the closed contacts 902. The opening of the contacts 795 prevents the application of ground through the closed contacts 733 to the mark pulse wiper 701, but a similar path therefor is provided through the closed contacts 796*a* and a lowermost pair of contact springs 762 controlled by the asterisk relay 260 in the hundreds digit register 210.

Accordingly, the release of the thousands check relay 290 in the thousands digit register 200 transfers the control over the holding circuit of the operated relays in the hundreds digit register 210 to the contacts 524 controlled by the sender stop relay 520, extends marking ground to the contact arrangements controlled by the relays in the hundreds digit register 210 so that these relays control the next cycle of operation of the counting chain 400, and, by the opening of the contacts 795, transfers the control over the continuity of the pulsing path extending to the mark pulse wiper 701 to contacts controlled by the hundreds check relay 295 and the asterisk relay 260 in the hundreds digit register 210. The identifier sender is now conditioned for an additional cycle of operation under the control of the hundreds digit register 210 in which a group of mark pulses representing the value of the hundreds digit "3" is transmitted from the identifier sender to the trunk recorder 710.

In a manner similar to that described, the counting chain 400 is sequentially advanced under the control of the pulse generator 590 concurrently with the transmission of ground pulses to the mark pulse wiper 701 until such time as three mark pulses representing the hundreds digit "3" have been transmitted to the trunk recorder 710. At this time, the sender stop relay 520 operates, a space pulse is transmitted to the wiper 702, the counting chain 400 is restored to a normal condition, the operated relays 265 and 270 in the hundreds digit register 210 are released, and the hundreds check relay 295 is released. The release of this relay conditions the tens digit register 300 to control the next cycle of operation of the counting chain 400 under the control of the pulse generator 590. At this time, the trunk recorder 710 has been provided with two mark pulses representing the thousands digit "2," a space pulse, a group of three mark pulses representing the hundreds digit "3" of the calling substation designation, and a space pulse following this second group of mark pulses. Thereafter, the counting chain 400 is operated, as described in detail above, to transmit a group of four mark pulses representing the tens digit "4" under the control of the tens digit register 300, the relays in the tens digit register 300 and the relay 320 are released, and the counting chain transmits a group of five mark pulses representing the units digit "5" under the control of the units digit register 310. Following the completion of the transmission of this fourth group of mark pulses representing the value of the units digit of the designation of the calling substation, the sender stop relay 520 is operated, the operated relays in the register 310 are released, and a space pulse is transmitted to the wiper 702 to indicate that the transmission of the fourth group of pulses has been completed.

When the pulse generator 590 next releases the pulse generator relay 595 to open the contacts 596 and 597 and to close the contacts 598, the opening of the contacts 597 terminates the application of ground to the space pulse wiper 702, and the opening of the contacts 596 interrupts the holding circuit for the sender stop relay 520 and for the units check relay 360. The sender stop relay 520 in releasing serves to restore the counting chain 400 to a normal condition, as described above.

The release of the units check relay 360 closes the contacts 361 and 863 and opens the contacts 362, 363, 861, 862, 864, 865, 866, and 867. The closure of the contacts 361 prepares the operating path for the asterisk relay 365 in the units digit register 310. The opening of the contacts 362 removes the main source of holding ground for the identifier sender. The opening of the contacts 363 interrupts, at an additional point, the holding circuit for the units check relay 360. The opening of the contacts 861 interrupts, at an additional point, the operating circuit for the sender alarm relay 510. The opening of the contacts 862 interrupts the circuit for applying ground to the selected digit conductor, and the closure of the contacts 863 prepares an additional part of the circuit for applying ground to the no-identification conductor 725, which circuit remains interrupted at the open contacts 722. The opening of the contacts 864 interrupts, at an additional point, the operating circuit for the spill relay 900 which remains operated over the closed contacts 902.

The opening of the contacts 866 interrupts the holding circuit for the sender pulse relay 530 so that this relay releases to open the contacts 531, 532, and 533. The opening of the contacts 533 interrupts, at an additional point, the above described holding circuit for the relay 530. The opening of the contacts 532 prevents the application of additional pulses to either the mark or space pulse wipers 701 or 702. The opening of the contacts 531 prevents the application of additional pulses to the counting chain 400 which, as described above, has been restored to a normal condition.

Referring back to the release of the relay 60, the opening of the contacts 867 prevents reoperation of the sender pulse relay 530 by opening the energizing circuit for the lower winding thereof. The opening of the contacts 865 interrupts the charging circuit for the condensers 881 and 882 and, accordingly, terminates the flow of charging current through the operating winding of the alarm relay 920 so that this relay releases to close the contacts 921 and 823 and to open the contacts 922, 924, and 925. The closure of the contacts 921 prepares a portion of the operating circuit for the sender alarm relay 510, which circuit is interrupted at the open contacts 861. The opening of the contacts 924 interrupts an additional point in the operating circuit for the alarm relay 920. The opening of the contacts 925 interrupts an additional point in the above described circuit for returning ground from a trunk circuit to the Y stop conductor 603. The closure of the contacts 923 prepares the above described circuit for discharging the condensers 881 and 882 through the series resistor 883, which circuit remains interrupted at the open contacts 904.

The opening of the contacts 922, however, interrupts the holding circuit for the spill relay 900 so that this relay releases to open the contacts 401, 901, 902, 903, 905, 907, 908, 901*a*, and 902*a*, and to close the contacts 904, 906, 909, and 903*a*. The opening of the contacts 401 interrupts an additional point in the above described holding ground circuit for the identifier sender, and the opening of the contacts 901 removes ground from the pulse generator 590 to terminate operation of the pulse generator relay 595. The opening of the contacts 902 interrupts an additional point in the holding circuit for the relay 900. The opening of the contacts 903 removes ground from the above described signaling circuit extending to the conductor 601, and the closure of the contacts 904 completes the above described circuit for discharging the condensers 881 and 882.

The opening of the contacts 905 interrupts, at an additional point, the operating circuit for the lower winding of the sender pulse relay 530, and the closure of the contacts 909 prepares an additional point in the above described circuit extending to the Y stop conductor 603. The opening of the contacts 901*a* removes resistance ground from the wiper 703 of the trunk finder switch 700 to signify to the trunk or adapter circuit 720 that the transmission of information from the identifier sender has been completed and that the trunk or adapter circuit 720 may now proceed with the recording of duration information in the trunk recorder 710 or with any other information which is to be recorded at this point in the extension of the toll call. The opening of the contacts 902*a* removes ground from the guard conductor 601*a* to indicate that the identifier sender is idle and capable of being seized and utilized in conjunction with the identification of the calling subscriber involved in a subsequently placed toll call. The concurrent closure of the contacts 903a prepares the above described operating circuit for the start relay 910, which circuit is not completed at this time due to the removal of ground from the guard conductor 601a. The opening of the contacts 907 and 908 disconnects the lamps 585 and 586 from the terminal 588 so as to visibly indicate the release of the identifier sender.

The release of the spill relay 900 at the completion of the transmission of the pulse information representing the digits forming the designation of a calling substation also restores the trunk finder switch 700 to a normal position to interrupt the connection between the identifier sender and the trunk or adapter circuit 720. More specifically, in releasing, the spill relay 900 closes the contacts 906 so that the ground applied to a conductor 602 by the identifier sender allotter 600 is extended through the closed contacts 913, 906, and either of the off normal contacts 873 or 872 to the operating winding of the reset magnet 810. Operation of the reset magnet 810 restores the wipers 701 to 706, inclusive, to their normal home position and also returns the X and Y off normal springs to the position shown in Fig. 8 of the drawings. Restoration of the off normal springs to their normal home position conditions the trunk finder switch 700 for an additional cycle of operation and, in opening both of the springs 872 and 873, terminates the energization of the reset magnet 810 so that this magnet is restored to its normal condition. Incident to operation of the reset magnet 810, a pair of contacts 811 is closed to ground the guard conductor 601a to prevent seizure of the identifier sender until the trunk finder switch 700 has been restored to its normal condition. Operation of the motor magnet 810 also opens the contacts 812 to prevent the extension of ground to the operating winding of the start relay 910, thereby to prevent the initiation of a cycle of operation of the identifier sender until such time as the magnet 810 is released at the termination of the resetting operation.

2. *Operation of the identifier sender when a complete designation is not received from the identifier circuit 100*

The identifier sender includes means controlled by the check relays 290, 295, 320, and 360 for making repeated attempts to secure a complete calling substation designation from the common identifier circuit 100 in the event that correct combinational code designations are not stored in each of the registers 200, 210, 300, and 310 within a predetermined time interval. If this information is not received in response to the first association of the identifier circuit with the identifier sender, the output of the identifier circuit is blocked following a suitable time delay to release all of the operated register relays in the identifier sender and is thereafter again rendered effective in a second attempt to secure correct combinational code registrations of the four digits forming the directory number of the calling substation. If, following this second attempt to secure a correct registration in the identifier sender, some items of information are still not provided, an arbitrary signal is stored in the registers which do not contain correct combinational code registrations, an alarm indication is provided, and the sending cycle of operation of the identifier sender is initiated with a space pulse being transmitted by the identifier sender in place of each of the missing digits.

More specifically, and as described in detail above, when the cut-through relays 220 and 580 are operated in response to the completion of the association of the identifier sender with the trunk circuit 720, each of the digit registers 200, 210, 300, and 310 is associated with the output of one of the identifiers 101, 640, 650, and 660, and the identification register relay, similar to the relay 140, in each of these identifiers is operated to render the outputs of the identifiers effective to supply ground signals to the register circuits so that two of the five register relays in each of the registers are operated in accordance with the value of the corresponding identified digit in the designation of the calling substation.

Assuming that the hundreds, tens, and units digits of the calling substation involved in the illustrative toll call set forth above are stored in the registers 210, 300, and 310 i. e. the digits "345," the hundreds, tens, and units check relays 295, 320, and 360 are operated as described above. However, assuming that incorrect information is provided by the thousands digit identifier 101, only the register relay 255 in the thousands digit register 200 is operated to close the contacts 256, 257, 259, 256a, 257a, and 756 and open the contacts 258. The closure of the contacts 256 prepares a holding circuit for the relay 255, which circuit is interrupted at the open contacts 401. The closure of the contacts 257 prepares an operating circuit for the lower winding of the thousands check relay 290, which circuit is interrupted at the open contacts controlled by the relay 235 so that the thousands check relay 290 does not operate.

Since this relay fails to operate to close the contacts 794, the spill relay 900 cannot be operated to initiate the sending cycle of operation of the identifier sender. Further, since the thousands check relay 290 does not operate, the contacts 291 remain closed to prepare an operating path for the asterisk relay 230 in the thousands digit register 200, and the contacts 793 remain closed to prepare a circuit for applying ground to the no-identification conductor 725. However, the operation of the hundreds, tens, and units check relays to open the contacts 798, 823, and 863 prevent an application of ground to the no-identification conductor 725. Further, since the spill relay is not operated to initiate a sending cycle of operation of the identifier sender, direct ground remains on both the Y stop conductor 603 and the conductor 601a so that the cut-through relays 220 and 580 remain operated. Thus, the interconnection between the common identifier circuit 100 and the seized identifier sender remains intact.

The identifier sender and the identifier circuit 100 remain in this condition until the timing circuit 500 releases and reoperates the identification register relays such as the relay 140 in an attempt to secure a complete and correct combinational code storage of all the digits of the designation of the calling substation. More specifically, in response to the completion of the association of the identifier sender with the trunk circuit 720, the cut-through relay 580 is operated to close the contacts 581, 582, and 583. The closure of the contacts 583 interconnects a ground with the timing circuit 500 through a plurality of contacts 571 and 572 controlled by the pulsing relay 570. The closure of the contacts 582 applies ground from the closed contacts 551 to the conductor 599 to provide ground to the paths controlled by the decoding relays in the identifier circuit 100 and to operate the identification register relays, similar to the relay 140, therein so as to render the outputs of the amplifying and detecting channels effective. The closure of the contacts 581 interconnects the operating winding of the pulsing relay 570 with a terminal 589 which is provided with one hundred and twenty ipm signals.

Therefore, at the end of an average time interval of approximately one quarter of a second, the first momentary ground impulse is applied to the operating winding of the pulsing relay 570 to operate this relay to close the contacts 571 and to open the contacts 572. The opening of the contacts 572 produces no useful function, but the closure of the contacts 571 completes an operating circuit for the first timing relay 540 extending through a plurality of closed contacts 562 and 552. The operation of the relay 540 closes a plurality of contacts 541 and 542 and opens a pair of contacts 543. The closure of the contacts 541 provides an additional source of ground for the conductor 599, and the opening of the contacts 543 serves no useful function at this time. The closure of the contacts 542 prepares an operating circuit for the lower winding of the second timing relay 550, this operating winding being shunted to ground on both sides thereof during the interval in which the pulsing relay 570 is maintained operated.

When the pulsing relay 570 is released, the contacts 572 are first closed to complete a series circuit extending from the operating winding of the first timing relay 540, one side of which is connected to grounded battery, through the lower winding of the second timing relay 550 and the closed contacts 542, 572, and 583 to ground. When the contacts 571 are thereafter opened to remove the ground shunt from around the lower winding of the relay 550, this relay operates in series with the relay 540 to close a plurality of contacts 553 and 554 and to open a plurality of contacts 551, 552, and 555. The opening of the contacts 552 interrupts a point in the above described operating circuit for the first timing relay 540, and the concurrent closure of the contacts 553 prepares an energizing circuit for the upper winding of the second timing relay 550. The opening of the contacts 551 removes ground from the conductor 599, but ground is maintained thereon by the closed contacts 541. The closure of the contacts 554 prepares an operating path for the lower winding of the third timing relay 560. The opening of the contacts 555 removes ground from a path for applying ground to the operating windings of the asterisk relays in the registers 200, 210, 300, and 310, which circuit is interrupted at a pair of open contacts 564.

At the end of the next half second interval or following an average elapsed time of three-fourths of a second, the pulsing relay 570 is again operated under the control of the signals supplied from the terminal 589. The reoperation of the pulsing relay 570 first closes the contacts 571 and then opens the contacts 572. The prior closure of the contacts 571 completes an operating circuit extending to the upper winding of the second timing relay 550 through the closed contacts 583, 571, 562, and 553. The subsequent opening of the contacts 572 interrupts the above described series circuit including the operating windings of both of the relays 540 and 550 so that the first timing relay 540 is released to open the contacts 541 and 542 and to close the contacts 543.

The opening of the contacts 541, considered in conjunction with the fact that the second timing relay 550 remains operated to hold the contacts 551 open, removes the last source of ground from the conductor 599 so that ground is removed from the paths controlled by the output coding relays in the identifier circuit 100. This releases all of the operated relays in the registers 200, 210, 300, and 310 in the identifier sender to release all of the check relays 295, 320, and 360, the thousands check relay 290 not previously having been operated, as described above. Further, the removal of ground from the conductor 599 releases all of the relays similar to the identification register relay 140 so that the outputs of the ten amplifying and detecting channels in each of the identifiers 101, 640, 650, and 660 are effectively blocked. Accordingly, at the end of a time interval which will average approximately three-fourths of a second, if the identifier sender has not received a complete complement of combinational code registrations from the identifier circuit 100, as evidenced by the release of the cut-through relays 220 and 580, the timing circuit 500 removes ground from the conductor 599 to effectively block the output from the identifier circuit 100 and to release all of the operated register relays in the identifier sender together with the operated ones of the associated check relays.

In addition to opening the contacts 541, the release of the first timing relay 540 to open the contacts 542 interrupts an additional point in the holding circuit for the relays 540 and 550. The closure of the contacts 543 concurrently therewith prepares an energizing circuit for the lower winding of the third timing relay 560. However, this circuit is interrupted at the open contacts 572.

When the pulsing relay 570 releases shortly following its second operation, the contacts 572 are first closed to prepare a series circuit extending from grounded battery through the upper winding of the relay 550, the lower winding of the relay 560, and the closed contacts 554, 543, 572, and 583 to ground. However, when the contacts 571 are opened to remove the ground shunt, the second timing relay 550 is maintained operated over the above described circuit and the third timing relay 560 is operated over this circuit to close a plurality of contacts 561, 563, and 564 and to open the contacts 562. The opening of the contacts 562 interrupts the above described operating circuit for the second timing relay 550, and the concurrent closure of the contacts 563 prepares an operating circuit extending to the upper winding of the third timing relay 560. The closure of the contacts 564 prepares a portion of a circuit for operating the asterisk relays 230, 260, 330, and 365 in the registers 200, 210, 300, and 310, in addition to providing a source of ground for extension to the no-identification conductor 725. The closure of the contacts 561 again applies ground to the conductor 599 so that the identifier circuit 100 is rendered effective to supply two out of five combinational code signals to the identifier sender representing the digits of the designation of the calling line. In the event that all of the necessary digital information is provided to the identifier sender by the second association of the identifier circuit 100 with the identifier sender, all of the check relays 290, 295, 320, and 360 are operated to cause the operation of the spill relay 900 and the initiation of the cycle of operation described in detail hereinabove during which the cut-through relays 220 and 580 are released. The release of the cut-through relay 580 disconnects the pulsing relay 570 from the terminal 589 to remove ground from the timing circuit 500 so that the timing relays 550 and 560 are released to restore the timing circuit 500 to a normal condition.

However, assuming that once again the thousands digit register 200 fails to receive proper combinational code information so that only the relay 255 is operated, the failure to store a complete combinational code designation in the register 200 again prevents the operation of the thousands check relay 200 and, accordingly, prevents the operation of the spill relay 900 so that the identifier sender remains in the same condition described above in which the check relays 295, 320, and 360 together with certain ones of the associated register relays in the registers 210, 300, and 310 are operated to store the hundreds, tens, and units digits "3," "4," and "5," respectively. The timing circuit 500 now operates to record an arbitrary signal in the thousands digit register 200 by artificially operating the asterisk relay 230 to produce an artificial operating circuit for the thousands check relay 290, thereby to enable a sending operation of the identifier sender to be initiated in which a space pulse will be transmitted to the trunk recorder 710 in place of the thousands digit which was not stored in the identifier sender.

More specifically, following an additional elapsed time interval of one-half second or an average total elapsed time of a second and one-quarter, ground is again applied to the operating winding of the pulsing relay 570 so that the contacts 571 are first closed and the contacts 572 thereafter opened. The closure of the contacts 571 completes an operating circuit extending to the upper winding of the third timing relay 560 to maintain this relay operated. The opening of the contacts 572 thereafter opens the series circuit including the upper winding of the second timing relay 550 and the lower winding of the third timing relay 560 so that the second timing relay 550 releases to close the contacts 551, 552, and 555 and to open the contacts 553 and 554. The closure of the contacts 51 applies an additional source of ground to the conductor 599 for maintaining the output of the common identifier circuit 100 effective. The opening of the contacts 553 together with the closure of the contacts 552 interrupts one operating circuit for the upper winding of the second timing relay 500 and prepares an operating circuit for the operating winding of the first timing relay 540. The opening of the contacts 554 opens an additional point in the series circuit for maintaining the second and third timing relays 550 and 560 operated.

The closure of the contacts 555 applies ground through the closed contacts 564 to the path including the series connected contacts 793, 798, 823, and 863 controlled by the check relays 290, 295, 320, and 360. Since the contacts 798, 823, and 863 are open, ground is not forwarded through the closed contacts 793 and 722 to the no-identification conductor 725 and, accordingly, an indication is provided that at least some digital information relating to the designation of the calling substation has been received from the common identifier circuit 100. In addition, the ground provided at the closed contacts 555 is extended through the closed contacts 229 and 291 to the upper operating winding of the asterisk relay 230 in the thousands digit register 200. This ground is further supplied at the closed contacts 221*a*, 222*a*, and 223*a*, but it does not result in the operation of the asterisk relays 260, 330, and 365 in the hundreds digit register 210, the tens digit register 300, and the units digit register 310, respectively, inasmuch as the contacts 296, 321, and 361 in the respective operating circuits therefor are previously opened by the operation of the check relays 295, 320, and 360.

The operation of the asterisk relay 230 in the thousands digit register 200 closes a plurality of contacts 231, 233, 234, 231*a*, and 731 and opens a plurality of contacts 232, 732, and 733. The closure of the contacts 231 completes a holding circuit for the asterisk relay 230 extending to the open contacts 401 through the normally closed contacts 524 controlled by the sender stop relay 520. The closure of the contacts 233 prepares an alternative holding circuit shunted around the contacts 291 to the ground supplied at the closed contacts 555. The closure of the contacts 231*a* artificially marks the "1" manifesting marking or control conductor extending to the counting circuit 400. The opening of the contacts 732 produces no useful function, but the concurrent closure of the contacts 731 prepares a circuit for applying ground to the alarm conductor 601 which terminates in the identifier sender allotter 600 so as to provide an indication in the allotter 600 that some item of digital information has not been supplied to the identifier sender from the identifier circuit 100. The opening of the contacts 733 disconnects the mark pulse wiper 701 from the pulse forming contacts 597 to prevent the application of mark pulses to the wiper 701 during the cycle of operation controlled by the thousands digit register 200.

The operation of the asterisk relay 230 in the thousands digit register 200 also artificially operates the thousands check relay 290 so that a scanning or pulse transmitting cycle of operation of the identifier sender is initiated. More specifically, the closure of the contacts 234 applies ground to the lower winding of the thousands check relay 290 so that this relay operates to actuate its contacts, as described above. Included in these contact operations is the closure of the contacts 794 to complete the operating circuit of the spill relay 900 which, in operating, produces the same functions described in detail above. In addition to these functions, the closure of the contacts 903 provides ground which is extended through the closed contacts 731 and through one of the contacts similar to the contacts 732 controlled by the asterisk relays 260, 330, or 365 to be applied to the alarm conductor 601, thereby to provide an alarm in the identifier sender allotter 600 indicating that at least one item of information was not registered in the identifier sender.

Further, incident to the operation of the spill relay 900, the identifier circuit 100 is released, and the identifier sender allotter removes ground from the conductor 609 so that the cut-through relays 220 and 580 are released, the release of the cut-through relay 220 interrupting the above described operating circuit for the asterisk relay 230. However, this relay remains operated over the circuit including the closed contacts 231, 524, and 401 following the operation of the thousands check relay 290 to open the contacts 291 and the release of the relay 220 to open the contacts 229. The release of the cut-through relay 580 terminates operation of the pulsing relay 570 and removes ground from the timing circuit 500 so that the timing relays 540, 550, and 560 therein are all restored to a normal condition. In being restored to a normal condition, the timing circuit 500 removes ground from the signalling path extending to the no-identification conductor 725 and to the previously interrupted paths extending to the operating windings of the asterisk relays in the registers 200, 210, 300, and 310.

As described above, the operation of the spill relay 900 places the pulse generator 590 in operation so that the pulse generator relay 595 is alternately operated and released. In response to the first cycle of operation in which the contacts 598 are opened and the contacts 596 and 597 closed, ground is forwarded through the closed contacts 597, 532, 526, 825, 796*a*, and 795 to be supplied to the open contacts 733. Therefore, the operations of the asterisk relay 230 to open the contacts 733 prevents the recording of any mark pulses representing a digit which has not been properly stored in the identifier sender. The closure of the contacts 596, as described above, operates the first counting relay 410 to close the contacts 411, 413, 414, and 415 and to open the contacts 412. The closure of the contacts 415 extends the "1" representing conductor which is connected to ground through the closed contacts 231*a* and 791 to the open contacts 476. The closure of the contacts 414 prepares an operating circuit for the relay 470. The opening of the contacts 598 produces no useful function at this time.

When the pulse generator relay 595 is next released, the opening of the contacts 596 and 597 produces no useful function, but the closure of the contacts 598 completes the operating circuit for the relay 470 so that this relay operates to close the contacts 472, 475, and 476 and to open the contacts 471, 473, and 474. The closure of the contacts 476 interconnects the grounded "1" marking conductor with the lower winding of the sender stop relay 520, thereby operating this relay to determinate further advance of the counting chain 400 and to prepare a path for applying a ground pulse to the space pulse wiper 702. Thereafter, the pulse generator relay 595 is operated to transmit a space pulse to the trunk recorder 710 in place of the missing thousands digit, and the counting chain 400 is restored to its normal condition. Incident to the cycle of operation of the pulsing relay 595 in which the space pulse is recorded on the trunk recorder 710, the opening of the contacts 598 removes ground from the closed contacts 523 to which the holding circuit for the asterisk relay 230 has been transferred so that the asterisk relay 230 releases and, in doing so, opens the contacts 234 in the operating circuit of the thousands check relay 290. However, this relay remains operated over the holding circuit including the closed contacts 293 which are supplied with ground through the closed contacts 596, 531, and 522. However, when the relay 595 next releases, the thousands check relay 290 is released to permit the identifier sender to transmit the pulses representing tthe values of the hundreds, tends, and units digits of the designation of the calling substation as set forth in detail above in conjunction with the description of the normal operation of the identifier sender. Following the completion of the transmission and recording of this information, the identifier sender is restored to a normal condition as described above with the exception that the opening of the contacts 903 in response to the release of the spill relay 900 removes the source of alarm ground from the conductor 601 which extends to the identifier sender allotter 600.

Although the operation of the identifier sender is set forth above in conjunction with an illustrative example in which the thousands digit of the designation of the calling substation is incorrectly stored in the thousands digit register 200 by the operation of only the relay 255, the operation of the identifier sender remains substantially unchanged in the event that three, four, or five of the register relays in the thousands digit register 200 are operated to provide an incorrect combinational code storage of the thousands digit. Further, the identifier sender operates, as described above, in the event that one, two, or three of the digits of the designation are either lacking or are stored in correct combinational code form in any group of the registers 200, 210, 300, and 310. Under these conditions, one of the asterisk relays 230, 260, 330, or 365 is operated under the control of the timing circuit 500, as described above, for each of the digits which is not correctly stored in the identifier sender and, during a readout or sending operation, a single space pulse is transmitted to the trunk recorder 710 in place of each of the missing digits. Therefore, if one or more of the digits of the directory number of the calling substation is correctly stored in combinational code form in the identifier sender, the identifier sender transmits all of the information provided by the identifier circuit 100 so that, even though a complete designation is not provided, as much identification information is supplied to the toll ticketing facilities as is possible, thereby permitting a determination by the accounting division personnel of the correct designation of the calling substation when the information stored in the trunk recorder 710 is subsequently recorded in permanent form during a playback or readout operation.

3. *Operation of the identifier sender when no calling substation information is provided*

When no calling subscriber information is provided to and correctly stored in combinational code form in the identifier sender, the identifier sender transmits a no-identification signal to the associated trunk or adapter circuit 720 to release the extended switch train. It is desirable to prevent a completion of the toll call when adequate calling subscriber information has not been provided since this prevents the correct assessment of the charge against the calling subscriber. Following the establishment of the no-identification signaling condition, the identifier sender transmits four space pulses to the trunk recorder 710 in place of the four missing digits of the calling substation designation.

More specifically, assuming that when the common identifier circuit 100 is associated with the identifier sender a correct combinational code designation is not provided in any of the registers 200, 210, 300, and 310, none of the thousands check relays 290, 295, 320, and 360 are operated, and the spill relay 900, which initiates the pulse transmitting cycle of operation of the identifier sender, remains released. Further, in remaining in their released condition, the check relays maintain the contacts 793, 798, 823, and 863 in a closed condition so that the no-identification signaling conductor 725, which extends to the trunk or adapter circuit 720, is connected to these series connected contacts through the closed contacts 722 controlled by the cut-through relay 220. The cut-through relays 220 and 580 remain in an operated condition due to the failure of the spill relay 900 to operate to dismiss the identification circuit 100 and the associated identification matrix 630.

Therefore, the pulsing relay 570 is intermittently operated and released, as described above, so that, at the end of an average time interval of three quarters of a second, the first and second timing relays 540 and 550 are in an operated condition to remove ground from the conductor 599. The removal of ground from this conductor, as described above, momentarily blocks the output of the identifier circuit 100. When the pulsing relay 570 next releases to operate the third timing relay 560, the contacts 561 are closed, as described above, to again apply ground to the conductor 599. This results in the identifier circuit 100 making another attempt to supply digital information to the identifier sender. In the event that one or more digits of the calling substation designation are correctly registered in combinational code form in the registers 200, 210, 300, and 310, the identifier sender operates asterisk relays in the registers in which digital information has not been correctly stored and thereupon completes the operating circuit for the spill relay 900 so that the items of information which have been correctly stored in the identifier sender are transmitted to the trunk recorder 710 in conjunction with interposed space pulses in place of the digits which have not been correctly stored in the identifier sender. Following the completion of the transmission of these items of information to the trunk recorder 710, the identifier sender is restored to a normal condition in which the trunk finder switch 700 is returned to its normal home position to interrupt the interconnection between the trunk or adapter circuit 720 and the identifier sender.

However, assuming that the second attempt to supply digital information to the identifier sender is not successful and no digital information is received, at the end of an average time interval of approximately one and one quarter seconds, the second timing relay 550 is released so that only the third timing relay 560 remains operated. The release of the timing relay 550, in closing the contacts 555, applies ground over the series path including the closed contacts 564, 863, 823, 798, 793, and 722 to the no-identification signaling conductor 725 which terminates in the trunk or adapter circuit 720. The application of ground to this conductor operates a no-identification relay or other control means in the circuit 720 so that busy tone is returned to the calling subscriber to indicate that the toll connection cannot be completed due to the failure to establish any items of information pertaining to the designation of the calling substation.

In addition, the closure of the contacts 555 supplies ground to four parallel paths including the contacts 229, 221*a*, 222*a*, and 223*a* to operate the asterisk relays 230, 260, 330, and 365 in each of the registers 200, 210, 300, and 310, respectively. The operation of the asterisk relays closes contacts in each of the registers, similar to the contacts 234 in the thousands digit register 200, so that the four check relays 290, 295, 320, and 360 are artificially operated. The operation of these relays in opening contacts similar to the contacts 733 prevents the application of mark pulses to the mark pulse wiper 701 during a pulse sending operation of the identifier sender. Further, in operating the check relays to close the contacts 794, 799, 824, and 864, the operating circuit for the spill relay 900 is completed to initiate a sending cycle of operation of the identifier sender in which four space pulses are transmitted to the space pulse wiper 702, as described above, in place of the groups of mark pulses representing the digits of the designation of the calling substation. Following the completion of the transmission of this information, the identifier sender is restored to a normal condition, and the trunk finder switch 700 is restored to its normal home position to interrupt the association between the identifier sender and the trunk or adapter circuit 720.

*4. Operation of the identifier sender when pulse transmitting operations are not completed within a predetermined time interval*

The identifier sender includes timing means which are responsive to the failure of the identifier sender to complete its pulsing operations within a predetermined time interval for establishing an alarm condition in the identifier sender and for preventing further seizure of the identifier sender by the identifier sender allotter 600. This prevents the possible loss of calling substation designation information by the association of an inoperative identifier sender with the common identifier circuit 100.

More specifically, as described above, in response to seizure of the identifier sender, the start relay 910 is operated to close the contacts 912 to complete the operating circuit for the alarm relay 920 which extends to ground through a series resistor 883 and a pair of condensers 881 and 882. The time constant of the charging circuit for the condensers 881 and 882, which includes the resistance of the winding of the relay 920 and that of the resistor 883, is such that a charging current sufficient to maintain the alarm relay 920 operated is provided for a time interval of between three to four seconds. Further, as described above, a sending or pulsing operation of the identifier sender is always initiated after an interval of no more than one and one-half seconds following the seizure of the identifier sender when full information or no information or incomplete information is received from the identifier circuit 100. If this pulsing operation has not been completed following the expiration of the three to four second time interval provided for maintaining the alarm relay 920 operated, as indicated by the release of the start relay 910 and the spill relay 900, the relay 920 releases to prepare a circuit for operating the sender alarm relay 510. The release of the alarm relay 920 closes the contacts 921 and 923 and opens the contacts 924 and 925.

The closure of the contacts 921 completes an operating circuit for the sender alarm relay 510 which extends through the contacts 861 which are maintained closed by the operated units check relay 360 until such time as the pulsing operations of the sender are completed. In operating, the sender alarm relay 510 closes a plurality of contacts 511, 512, and 514 and opens the contacts 513 and 515. The closure of the contacts 511 completes a holding circuit for the sender alarm relay 510 extending to a pair of normally closed contacts 591 forming a portion of a manually actuated alarm release key. The closure of the contacts 512 connects ground to a sender failure alarm lamp 587 to provide a visible indication of the alarm condition existing in the identifier sender. The closure of the contacts 514 applies ground to the guard conductor **601*a* to mark the identifier sender as busy in the banks of contacts of the switching means in the identifier sender allotter 600, thereby to prevent seizure of the identifier sender. The opening of the contacts 513 removes ground from the above described circuit extending to the all senders busy conductor 602*a*** so as to indicate that the identifier sender is busy.

Referring back to the release of the alarm relay 920, this opens the contacts 922 to interrupt the holding circuit extending through the closed contacts 902 for the spill relay 900 so that this relay releases. In releasing, the spill relay performs the functions described above and included in which is the removal of operating ground from the pulse generator 590 so that intermittent cyclic operation of the counting chain 400 and the concurrent transmission of pulses to the space and mark pulse wipers 701 and 702 is terminated. The release of the spill relay further partially conditions the identifier sender for a subsequent seizure as described above and, in opening the contacts 401, removes holding ground from the plurality of operated register relays in the registers 200, 210, 300, and 310 so that these relays are released together with the operated ones of the check relays 290, 295, 320, and 360. The release of the check relay 360, in opening the contacts 861, interrupts the above described operating circuit for the sender alarm relay 510, but this relay remains operated over the holding circuit including the closed contacts 511.

The sender alarm relay 510 remains operated to busy out the identifier sender and to prevent its seizure until such time as the alarm release key is actuated to open the contacts 591, thereby removing holding ground from the sender alarm relay 510 to permit this relay to release to restore the identifier sender to a normal condition. Incident to release of the relay 510, the contacts 513 return ground to the all identifiers busy conductor **602*a* to indicate that at least one identifier sender is idle and available, and the contacts 514 remove ground from the guard conductor 601*a* to indicate that the identifier sender shown in the drawings is available for seizure by the identifier sender allotter 600**.

The sender alarm relay 510 also provides an indication of improper operation of the counting chain 400. More specifically, in the event that, during a single cycle of operation of the counting chain 400, a stop ground condition is not encountered on one of the marking conductors extending thereto, an overflow relay 465, forming the eleventh relay in the counting chain 400, is operated to close a pair of contacts 467, among others. The closure of the contacts 467 completes an obvious operating circuit for the sender alarm relay 510 so that this relay operates to perform the functions described above and included in which is the closure of the contacts 511 to establish a holding circuit for this relay extending to the closed and grounded contacts 591.

In addition, the operation of the overflow relay 465 closes a pair of contacts 466 so that direct ground is artificially connected through a pair of closed contacts 486 to the operating winding of the sender stop relay 520, thereby artificially operating this relay to indicate that ground has been found on one of the marking conductors extending from the registers 200, 210, 300, or 310 to the counting chain 400. The operation of the sender stop relay 520 terminates the application of mark pulses to the trunk recorder, restores the counting chain 400 to a normal condition and permits the cyclic operation of the sender portion of the identifier sender to continue in a normal manner until such time as all of the remaining information has been transmitted from the identifier sender to the associated trunk recorder 710. However, due to the concurrent operation of the sender alarm relay 510, the identifier sender remains in an alarm condition and is busied out to prevent its reuse during calling substation identification operations under the control of the identifier sender allotter 600. This alarm condition is maintained in the identifier sender until such time as the alarm release key is manually actuated to open the contacts 591, thereby releasing the sender alarm relay 510.

In order to provide manually controlled means for rendering the identifier sender busy, a manually actuated busy key shown in Fig. 8 of the drawings is provided. Operation of this key opens the contacts 891 and 892 so that ground is removed from the all senders busy conductor **602*a* to indicate that the identifier sender is not in an idle condition. The opening of the contacts 892 interrupts the above described circuit extending from the guard conductor 601*a* through the interrupter contacts 812 for operating the start relay 910, thereby to prevent the identifier sender from being placed in operation by operation of the start relay 910. The identifier sender is restored to its normal operative condition in response to release of the busy key so that the contacts 891 and 892** are again closed.

Accordingly, the telephone system of the present invention provides new and improved line identifying means including a register sender or an identifier sender and a common identifier circuit. The identifier circuit comprises a plurality of separate amplifying and detecting channels, each having a selectively controlled flip-flop type output stage. The identifier supplies coded digit representing signals for storage in the identifier sender which also includes means for determining whether correct combinational code storage of the digits of the designation of a calling line have been made. The sender also includes timing means which operate in conjunction with the code storage determining means for making repeated attempts to secure storage of a complete calling line designation in the identifier sender. For those digits which are not supplied to the identifier sender, an arbitrary signal is stored in the associated digit register to permit the identifier sender to initiate its pulse transmitting cycle of operation in which a space or control pulse is transmitted in place of the group of pulses representing the missing digit or digits. Further, in the event that no information is provided to the identifier sender from the common identifier circuit 100, a signal indicative of this fact is supplied to the trunk or adapter circuit 720 and four space or control signals are transmitted to the interconnected trunk recorder. The system also includes means for interlocking the identifier circuit with an allotter which controls the association of the sender with the identifier to prevent operation of the allotter until the identifier has been completely released and restored to normal.

Although the operation of the telephone system of the present invention is described above in conjunction with particular means for selecting, storing, and recording data pertaining to toll calls, it should be understood that many other modifications and embodiments may be provided by those skilled in the art which will fall within the spirit and scope of the principles of the present invention.

What is claimed and desired to be secured by Letters Patent of the United States is:

1. In a system for identifying a telephone subscriber, means for supplying signals representing the designation of a subscriber, detecting means responsive to said signals and including a plurality of signal translating devices each having a control electrode, control means connected to the control electrodes of said translating devices for normally blocking an output therefrom, a plurality of separate register means each adapted to store a subscriber designation, switching means for associating one of said register means with said detecting means, and means controlled by said switching means for operating said control means following the association of one of said register means with said detecting means to render said translating devices effective to store a subscriber designation in said associated register in accordance with the signals supplied to said detecting means.

2. In a system for identifying a telephone subscriber, signaling means for supplying signals representing the designation of a subscriber, detecting means including output means operable from normal conditions to conditions representative of a designation in accordance with said signals, a plurality of registers for storing said designation, switching means for associating one of said registers with said output means, means operated in response to the association of said one register with said output means for operating said signaling means to supply signals to said detecting means so that a designation is stored in said one register, means including said switching means for releasing the association between said output means and said one register, and control means controlled by said output means for preventing reoperation of said signaling means until said output means are restored to said normal conditions.

3. The system defined in claim 2 in which means are provided for rendering the control means effective in response to the association of said one register with said output means.

4. In a system for identifying a telephone subscriber, signaling means for supplying signals representing the designation of a subscriber, detecting means operable from a normal condition to a condition representing said designation in accordance with said signals, a plurality of registers for storing said designation, allotter means including switching means for associating one of said registers with said detecting means, means included in said allotter and effective following the association of said one register with said detecting means for controlling the operation of said signaling means to supply designation representing signals to said detecting means, said signals operating said detecting means from its normal condition to store said designation in said one register, release means for operating said switching means to release said one register and to interrupt the supply of signals to said detecting means, and means controlled by the return of said detecting means to its normal condition for conditioning said means included in the allotter for again controlling the operation of said signaling means.

5. The system set forth in claim 4 in which means are provided for rendering the said means included in the allotter ineffective to control the operation of said signaling means following the operation of said detecting means from its normal condition to a condition representing said designation.

6. The system set forth in claim 4 in which means are provided for operating said release means in response to the storage of said designation in said one register.

7. A register sender comprising a plurality of registers adapted to store a plurality of digits in coded form, check means associated with each of said registers and operable to indicate the storage of a digit in correct coded form in each of said registers, sender means common to all of said registers for transmitting signals in accordance with the stored digits, and means including said check means for sequentially associating said sender means with each of said registers for controlling the transmission of signals in accordance with the value of each of the stored digits.

8. A register sender comprising a plurality of separate registers each adapted to individually store a digit in coded form, check means associated with each of said registers to be operated in accordance with the storage of a digit in corrected coded form in the associated register, sender means common to said register for transmitting signals in accordance with the stored digits, and circuit means including said check means for sequentially releasing said check means to sequentially associate said sender means with each of said registers so that the sender means transmits signals in accordance with the value of each of the stored digits.

9. A register sender for use with digital data provided in a coded form utilizing a predetermined number of marking conditions, comprising a plurality of groups of register devices for storing coded digits, means for operating each of said groups of devices in accordance with digits to be stored to operate a number of devices in each of said groups corresponding to said predetermined number, check means associated with each of said groups of devices, circuit means associated with each of said groups of devices for operating said check means when said predetermined number of devices in each of said groups is operated, sender means for transmitting signals in accordance with said stored digits, and means including said check means for sequentially associating said sender means with each of said groups of devices to control the operation of said sender means.

10. A register sender for use with digital data provided in a coded form utilizing a predetermined number of marking conditions, comprising a plurality of groups of register devices for storing coded digits, means for storing coded digits in said groups of devices by operating said predetermined number of devices in each of said groups in accordance with the digits to be stored, check means associated with each of said groups and operable to indicate that said predetermined number of register devices are operated in the associated group thereof, sender means for transmitting signals in accordance with the values of the stored digits, means controlled by said check means for initiating operation of said sender means following the storage of a predetermined number of digits in said groups of register devices, separate circuit means controlled by each of said groups of register devices in accordance with the values of the stored digits, and means including said check means for sequentially associating each of said separate circuit means with said sender means to control the operation thereof.

11. A register sender as defined by claim 10 in which the separate circuit means include means for translating the stored coded digits to marking conditions representing numerical digits.

12. A register sender for use with digits expressed in a coded form comprising a plurality of digit registers, means for operating said registers to store a group of digits in said coded form, check means associated with each of said registers, means for operating each of said check means in response to the storage of a digit in a correct coded form in the associated register, separate circuit means controlled by each of said registers to establish marking conditions representing the value of the stored digit, sender means common to said circuit means for providing signals in accordance with the stored digits, and means for sequentially releasing said check means to successively connect said separate circuit means with said sender means.

13. A register sender as set forth in claim 12 in which means are provided for initiating operation of said sender means in response to the operation of said check means.

14. A registering apparatus for use with a source of signals representing a digit, a register for storing said digit, first control means for making repeated attempts to store a digit in said register in accordance with said signals, and second control means controlled by said register for storing an arbitrary signal in said register if said repeated attempts fail to store a digit in said register.

15. A registering apparatus as set forth in claim 14 including sender means controlled by said register for transmitting signals in accordance with a registered digit, and means operated by the storage of said arbitrary signal in said register for initiating operation of said sender means.

16. A registering apparatus comprising a source of digit representing signals, a register for storing a digit, first control means for making a first attempt to store a digit in said register in accordance with said signals, second control means controlled by said register for operating said first control means to make a second attempt to store a digit in said register if a digit is not stored therein by said first attempt, and means for storing an arbitrary symbol in said register if said second attempt fails to store a digit in said register.

17. A registering apparatus for use with a source of signals representing digits to be stored, a plurality of separate registers each adapted to store a digit in accordance with said signals, first control means for concurrently supplying said signals from said source to said plurality of registers to concurrently operate said registers to store a plurality of digits, and second control means including counting means for operating said first control means a predetermined number of times to make time spaced attempts to concurrently store digits in all of said plurality of registers so long as one or more of said registers do not store a digit.

18. A registering device comprising a plurality of separate registers each adapted to individually store a digit in coded form, signaling means operable to concurrently supply signals to said plurality of registers to store digits therein, check means associated with said registers and operable in accordance with the correct coded storage of digits in said registers, and means controlled by said check means for again operating said signaling means to concurrently supply signals to all of said plurality of registers if one of said registers fails to store a digit in correct coded form.

19. The registering device set forth in claim 18 in which means are provided controlled by said check means for clearing any operated ones of said registers when said signaling means is again operated to supply signals to said plurality of registers.

20. A register sender comprising a plurality of separate registers each adapted to individually store a digit in coded form, signaling means operable to supply signals to said plurality of registers to store digits therein, check means associated with each of said registers and operable in accordance with the correct coded storage of a digit in the associated register, sending means common to said registers for transmitting signals in accordance with the stored digits, means including said check means for sequentially associating said sender means with said registers in response to the storage of coded digits in said registers, and means including said cneck means for operating said signaling means to supply signals to said plurality of registers.

21. The register sender set forth in claim 20 in which means are provided for initiating operation of the sender means following the storage of digits in said registers.

22. The register sender set forth in claim 21 in which timing means are provided for initiating operation of the sender means following a predetermined time interval even if digits are not correctly stored in all of said registers.

23. In a telephone system, a plurality of subscriber lines, circuit means supplying alternating current signals representing the designation of a calling subscriber line, a plurality of bistable switching stages each including a control element, register means for storing a calling line designation connected to said plurality of switching stages, said switching stages normally being in a first condition to isolate said register means from incoming signals, and detecting means interposed between said circuit means and said switching stages to derive direct current signals of a selected magnitude from said alternating current signals for application to the control elements of selected ones of said bistable switching stages, said direct current signals operating said selected ones of said switching stages from said normal first condition to a second condition in which data is stored in said register means.

24. In a telephone system, a plurality of subscriber lines having individual designations, means for supplying signals representing the different digits of the designation of a calling line, a plurality of amplifying and detecting means equal in number to the digits forming the calling line designation, each of said amplifying and detecting means including ten amplifying and detecting channels corresponding to the digits "1"–"9" and "0," means supplying said channels with said signals so that a single channel in each of said amplifying and detecting means provides an output voltage representative of one of the digits of the designation, a plurality of coding relays associated with each of said amplifying and detecting means, each of said plurality of relays including ten relays representing the digits "1"–"9" and "0" and providing coded signals representative thereof, output switching means individual to each of said channels and normally effective to block control of said relays by said channels, a single one of said output switching means associated with each of said amplifying and detecting means being operated by said output voltage to operate a selected one of said coding relays, and means for rendering said switching means responsive to said output voltages so that said coding relays are operated in accordance with the designation of the calling line.

25. The identifying system set forth in claim 1 in which said control means includes means normally applying a first biasing voltage to said control electrodes to block an output from said translating devices and operable to apply a second biasing voltage to said control electrodes a selected time period after said operation of said control means for rendering said signal translating devices effective.

26. In a system for automatically identifying the plural digit designation of a calling substation, a plurality of separate registers each adapted to store a single digit of said designation in coded form, signaling means for supplying signals to said registers in accordance with said designation to store the digits thereof in said registers, a plurality of check means each controlled by one of said registers to be operated in response to the storage of a digit in the associated register in correct coded form, timing means for operating said signaling means to make a second attempt to store the digits of said designation in said registers, and means controlled by the concurrent operation of all of said check means for arresting operation of said timing means.

References Cited in the file of this patent

UNITED STATES PATENTS

| | | |
|---|---|---|
| 2,332,912 | Hecht et al. | Oct. 26, 1943 |
| 2,460,702 | Mallery | Feb. 1, 1949 |
| 2,668,931 | Hall et al. | Feb. 9, 1954 |
| 2,672,519 | Baker et al. | Mar. 16, 1954 |
| 2,719,250 | Six et al. | Sept. 27, 1955 |
| 2,724,743 | Benson | Nov. 22, 1955 |
| 2,739,187 | Holden | Mar. 20, 1956 |
| 2,773,127 | Coleman | Dec. 4, 1956 |

UNITED STATES PATENT OFFICE
CERTIFICATE OF CORRECTION

September 30, 1958 atent No. 2,854,519

Ben A. Harris

It is hereby certified that error appears in the printed specification of the above numbered patent requiring correction and that the said Letters Patent should read as corrected below.

Column 4, line 13, for "Serial No. 575,789" read -- Serial No. 575,798 --; column 8, line 49, for "dentifier" read -- identifier --; column 38, line 20, for "sending" read -- sender --.

Signed and sealed this 5th day of May 1959.

(SEAL)
Attest:

KARL H. AXLINE
Attesting Officer

ROBERT C. WATSON
Commissioner of Patents